(12) United States Patent
Yagyu et al.

(10) Patent No.: US 7,751,360 B2
(45) Date of Patent: Jul. 6, 2010

(54) PACKET TRANSMISSION SYSTEM, WIRELESS BASESTATION, AND ROUTE OPTIMIZATION FOR PACKET TRANSMISSION

(75) Inventors: Kengo Yagyu, Yokohama (JP); Shinji Takeda, Yokohama (JP); Hidenori Aoki, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 611 days.

(21) Appl. No.: 11/060,443

(22) Filed: Feb. 18, 2005

(65) Prior Publication Data

US 2005/0243757 A1 Nov. 3, 2005

(30) Foreign Application Priority Data

Feb. 18, 2004 (JP) ............................. 2004-041604
Sep. 24, 2004 (JP) ............................. 2004-277495

(51) Int. Cl.
*H04Q 11/00* (2006.01)
(52) U.S. Cl. .................................. 370/328; 455/422.16
(58) Field of Classification Search ................ 455/41.2, 455/422.1; 370/328
See application file for complete search history.

(56) References Cited

U.S. PATENT DOCUMENTS

| 5,655,219 | A | 8/1997 | Jusa et al. |
| 5,872,773 | A | 2/1999 | Katzela et al. |
| 6,785,552 | B2 | 8/2004 | Shinozaki et al. |
| 6,810,259 | B1 | 10/2004 | Zhang |
| 6,961,575 | B2 * | 11/2005 | Stanforth ................... 455/445 |
| 7,061,876 | B2 * | 6/2006 | Ambe ......................... 370/256 |
| 2001/0027107 | A1 | 10/2001 | Shinozaki et al. |
| 2003/0002482 | A1 * | 1/2003 | Kubler et al. ............... 370/352 |
| 2003/0053422 | A1 | 3/2003 | Ambe |
| 2003/0091001 | A1 | 5/2003 | Watanabe |
| 2003/0112810 | A1 | 6/2003 | Nakabayashi et al. |
| 2003/0165117 | A1 | 9/2003 | Garcia-Luna-Aceves et al. |
| 2005/0243757 | A1 | 11/2005 | Yagyu et al. |

FOREIGN PATENT DOCUMENTS

EP  0 849 974  6/1998

(Continued)

OTHER PUBLICATIONS

S. Corson, et al., "Mobile ad hoc Networking (MANET): Routing Protocol Performance Issues and Evaluation Considerations", Internet standard RFC 2501, Jan. 1999, pp. 1-12.

(Continued)

*Primary Examiner*—Lester Kincaid
*Assistant Examiner*—Sayed T Zewari
(74) *Attorney, Agent, or Firm*—Oblon, Spivak, McClelland, Maier & Neustadt, L.L.P.

(57) ABSTRACT

In a wireless packet transmission system that includes multiple wireless basestations and one or more wireless terminals belonging to one of the wireless basestations, transmission trees extending from two or more wireless basestations as root stations are used. Each of the wireless basestations has a tree table configured to record the root stations in association with the ID information about the transmission trees. When receiving a packet, each of the wireless basestations determines the transmission tree to be used for the packet transmission, and transmits the packet to a next node along the determined transmission tree.

17 Claims, 21 Drawing Sheets

FOREIGN PATENT DOCUMENTS

| | | |
|---|---|---|
| JP | 1-129550 | 5/1989 |
| JP | 2-137544 | 5/1990 |
| JP | 02-214349 | 8/1990 |
| JP | 4-284749 | 10/1992 |
| JP | 08-037535 | 2/1996 |
| JP | 9-182146 | 7/1997 |
| JP | 2000-69046 | 3/2000 |
| JP | 2000-78147 | 3/2000 |
| JP | 2000-261499 | 9/2000 |
| JP | 2002-118597 A | 4/2002 |
| JP | 2002-232448 A | 8/2002 |
| JP | 2002-247634 | 8/2002 |
| JP | 2002-534842 | 10/2002 |
| JP | 2002-369239 A | 12/2002 |
| JP | 2003-069625 | 3/2003 |
| JP | 2003-152786 | 5/2003 |
| JP | 2003-188811 | 7/2003 |
| JP | 2003-348130 A | 12/2003 |
| JP | 2005-6264 A | 1/2005 |
| KR | 2001-0062686 | 7/2001 |
| WO | WO 00/39967 | 7/2000 |

OTHER PUBLICATIONS

IEEE Standard for Information Technology-Telecommunications and Information Exchange Between Systems-Local and Metropolitan Area Networks-Common Specifications, Media Access Control (MAC) Bridges, ISO/IEC 15802-3:1998, ANSI/IEE Std 802.1D, 1998, pp. IV-XIX, 1-355.

U.S. Appl. No. 10/590,033, filed Aug. 18, 2006, Yagyu, et al.

Perkins, et al., "Ad hoc On-Demand Distance Vector (AODV) Routing", Network Working Group Request for Comments 3561, Category: Experimental. The Internet Society: Jul. 2003, pp. 1-37.

Ichiro Takashima, et al., "An Expanded Spanning-Tree Protocol for Home-Oriented Network Management", IEEE Transactions on Consumer Electronics, vol. 37, No. 3, Aug. 1991, pp. 379-387.

Ichiro Takashima, et al., "An Expanded Spanning-Tree Protocol for Home-Oriented Network Management", IEEE, Jun. 1991, pp. 84-85.

Karim El Malki, et al., "Hierarchical Mobile IPv4/v6 and Fast Handoffs", Mobile-IP Working Group Internet-Draft, Mar. 10, 2000, 20 pages.

C. Perkins, "IP Mobility Support", Network Working Group Request for Comments:2002, Oct. 1996, 62 pages.

* cited by examiner

FIG.4

| ROOT BRIDGE | TREE ID | PREVIOUS NODE | NEXT NODE |
|---|---|---|---|
| Bridge a | TREE A | Bridge a | – |
| Bridge b | TREE B | Bridge b | Bridge f |
| Bridge c | TREE C | Bridge c | Bridge f |
| Bridge d | TREE D | – | Bridge a<br>Bridge b<br>Bridge c<br>Bridge f |
| Bridge e | TREE E | Bridge a | Bridge c |
| Bridge f | TREE F | Bridge f | Bridge b<br>Bridge c |

FIG.5

| | To DS | From DS | ADDRESS 1 | ADDRESS 2 | ADDRESS 3 | ADDRESS 4 |
|---|---|---|---|---|---|---|
| STA→BRD | 1 | 0 | ADDRESS OF RECEIVING NODE | SOURCE ADDRESS | DESTINATION ADDRESS | RESERVED |
| BETWEEN BRDs | 1 | 1 | ADDRESS OF RECEIVING NODE | ADDRESS OF TRANSMITTING NODE | DESTINATION ADDRESS | SOURCE ADDRESS |
| BRD→STA | 0 | 1 | ADDRESS OF RECEIVING NODE | ADDRESS OF TRANSMITTING NODE | SOURCE ADDRESS | RESERVED |

FIG.10A

| Bridge | Signal | Queue size | Error Rate |
|---|---|---|---|
| a | −15dbm | 30k[bit] | $10^{-6}$ |
| b | −30dbm | 65k[bit] | $10^{-5}$ |
| c | −48dbm | 12k[bit] | $10^{-8}$ |
| e | −65dbm | 240k[bit] | $10^{-3}$ |

FIG.10B

| Bandwidth (Mbps) | link cost |
|---|---|
| 10 | 2,000,000 |
| 100 | 200,000 |
| 1000 | 20,000 |
| 10,000,000 | 2 |

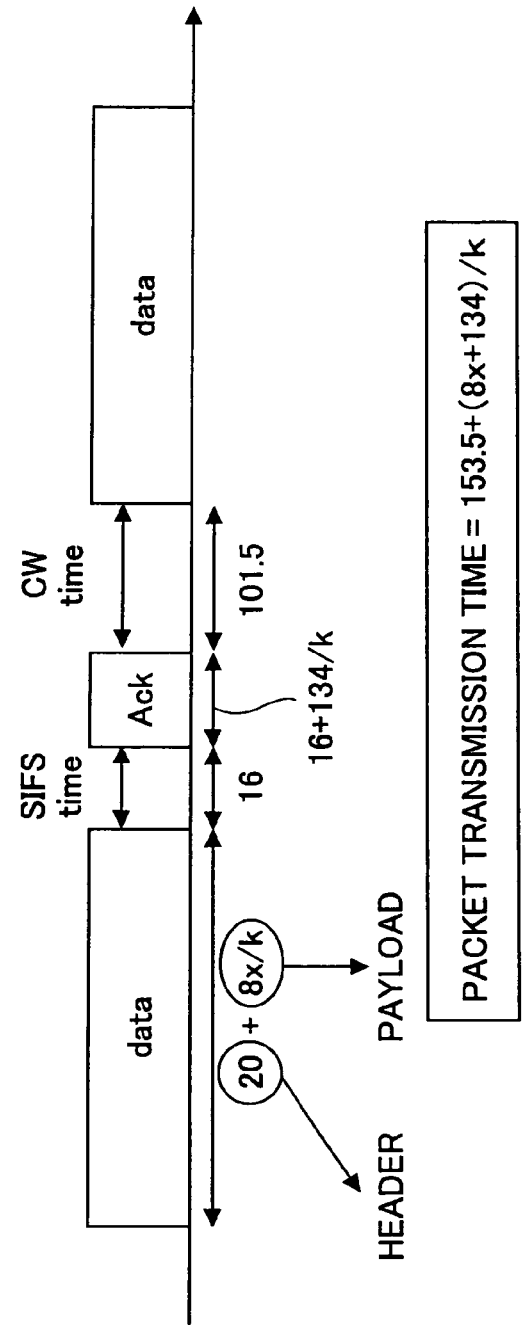

COMPARISON BETWEEN 6M 1-HOP ROUTE AND 27M 2-HOP ROUTE

- When Payload=1000 bytes 1 hop : 1510 × 1 = 1510 $\mu$s → 5.3Mbps
    2 hops: 454 × 2 = 908 $\mu$s → 8.6Mbps

- When Payload=100 bytes 1 hop : 310 × 1 = 310 $\mu$s → 2.6Mbps
    2 hops: 189 × 2 = 378 $\mu$s → 1.9Mbps

OPTIMUM ROUTE VARIES DEPENDING ON PAYLOAD SIZE

FIG.19A

| DESTINATION | ROUTE |
|---|---|
| A | – |
| B | B |
| C | B → C |
| D | B → C → D |
| E | F → E |
| F | F |

FIG.19B

| DESTINATION | ROUTE |
|---|---|
| A | – |
| B | B |
| C | B → C |
| D | B → C → D |
| E | B → C → D → E |
| F | F |

FIG.20A

| DESTINATION | NEXT NODE |
|---|---|
| A | – |
| B | B |
| C | B |
| D | B |
| E | F |
| F | F |

FIG.20B

| DESTINATION | NEXT NODE |
|---|---|
| A | – |
| B | B |
| C | B |
| D | B |
| E | B |
| F | F |

TRANSMIT PACKET FROM A TO E

ROUTE 1 : A→F→E
ROUTE 2 : A→B→C→E
ROUTE 3 : A→B→C→D→E

SHORT PACKET

```
Cost1 = AF+FE = 310+310 = 620
Cost2 = AB+BC+CE = 189+189+310 = 688
Cost3 = AB+BC+CD+CE = 756
```

LONG PACKET

```
Cost1 = AF+FE = 1510+1510 = 3020
Cost2 = AB+BC+CE = 454+454+1510 = 2418
Cost3 = AB+BC+CD+CE = 454+454+454+454 = 1816
```

PACKET TRANSMISSION SYSTEM, WIRELESS BASESTATION, AND ROUTE OPTIMIZATION FOR PACKET TRANSMISSION

FIELD OF THE INVENTION

The present invention relates to a packet transmission technique for realizing wireless transmission of packets between network segments, and more particularly, to a wireless basestation functioning as a wireless bridge and an optimum routing method used in an ad hoc wireless network with reduced load concentration.

BACKGROUND OF THE INVENTION

A network that allows two or more devices (or terminals) to link up spontaneously to conduct mutual communication is called an ad-hoc wireless network, or a multi-hop wireless network. Such a network does not require a specific control station, and the devices define a self-organized local network by themselves. In an ad hoc wireless network, terminals that cannot communicate directly with each other can transmit and receive packets via a third terminal located between them, while keeping the transmit power levels low. The communication range can be expanded with this arrangement. In fact, network layer routing protocols are proposed as the Internet standard of the ad hoc wireless network. See, for example, S. Corson and J. Macker, "Mobile Ad hoc Networking (MANET): Routing Protocol Performance Issues and Evaluation Considerations", Internet standard RFC 2501, January 1999.

On the other hand, in a wired network, packets are transmitted between different network segments using bridges, and a packet transmission technique based on a spanning tree protocol is known. See, for example, "Information Technology, Telecommunications and Information Exchange between Systems, Local Area Networks, Media Access Control (MAC) Bridges", ISO/IEC 10038, ANSI/IEEE Std 802.1D, 1993. With this technique, a specific bridge or basestation is selected as a root bridge, and a transmission tree extending from the root bridge is created using a spanning tree protocol to prevent a loop and realize a fault-tolerant system.

An example of the transmission tree in a wired network is illustrated in FIG. 1. Bridge 1 is selected as a root bridge, and a nonloop transmission tree is created from the root bridge. The nodes to which packets are transmitted are recorded in a learning table, in association with the radio interfaces.

In order to apply the above-described packet transmission technique using wired bridges to a wireless network, multiple wireless interfaces have to be provided to each of the nodes through which packets are transmitted. This attempt further requires an antenna and a modulation and demodulation circuit to be added to each of the interfaces; and is disadvantageous on the cost front.

To overcome this problem, JP 2000-69046A proposes a technique for virtually providing multiple wireless interfaces by regarding the address of the correspondent node as a virtual interface. This method allows the concept of wired network spanning tree to be applied to packet transmission in a wireless network, using substantially a single wireless interface. Each of the wireless basestations is furnished with an address table, in which table the address of the correspondent node is recorded in association with the next node to which the packet is to be transmitted.

Another publication JP 2000-78147A discloses a technique for reducing redundancy of packet transmission routes, making use of the feature of wireless communications, that is, the fact that packets can reach a wireless station as long as that wireless station is located within the communication range, even if the station is not the correspondent node. With this technique, each wireless station monitors packets approaching that station along a tree-like transmission route. A table is created to record the source device indicated by the source address contained in the packet, in association with the previous wireless node (or basestation) indicated by the address of the transmitting station. Using the table, a shorter route can be selected in packet transmission.

Still another publication JP 2003-188811 proposes a method for improving the communication quality by determining whether the power level of the signal received from a basestation is at or above a threshold level when creating a transmission tree, and by not establishing a link if the detected power level is below the threshold.

By the way, it is necessary for an ad hoc wireless network to select the optimum route in a short time when transmitting packets or creating a transmission tree if such a tree is used. However, in wireless communication channels, the network environment and conditions are likely to change, as compared with wired communication channels. Accordingly, JP 2003-152786A proposes to introduce a weighting value reflecting the bit error rate and the transmission rate between adjacent wireless devices (or wireless basestations) in determining the optimum route. The weighting values set in the links between adjacent devices are successively added up to determine the optimum route.

The packet transmission routing protocol proposed by the above-described Internet Standard RFC 2501 requires all the devices forming the network to be furnished with packet relay functions. In other words, devices with less sophisticated functions cannot participate in the network, and extra funds for adding functions or equipment are needed.

The above-described publication JP 2000-69046 tries to apply the concept of wired packet transmission disclosed in ANSI/IEEE Std. 802 to a wireless packet network, and a single transmission tree is used in a wireless network, as illustrated in FIG. 2. In this example, a tree indicated by the bold arrows extends from root Bridge "a". When transmitting a packet from Station S, which currently exists under Bridge b, to Station D, which currently belongs to Bridge c, the packet is transmitted through Bridge x7, Bridge x8, Bridge a, Bridge x3, and Bridge X4 along the route indicated by the dashed arrow. With this configuration, problems of route redundancy and concentration of load arise.

With the technique disclosed in JP 2000-78147A, the packet transmission route can be shortened by monitoring at a node those packets approaching that node. However, load concentration occurs at the root bridge of the transmission tree. Consequently, the entire network efficiency is lowered.

In the packet transmission system disclosed in JP 2003-188811, the determination whether to establish a channel between adjacent wireless basestations is made based on the power level of the received signal. However, the actual wireless communication environment changes easily, and wireless interfaces that adaptively change the communication rates according to the environment are also used. The technique shown in this publication cannot estimate the link cost reflecting the communication rate. Consequently, the throughput of the network is lowered as a whole, and the network connectivity is degraded.

The route optimization method disclosed in JP 2003-152786A considers the change in the wireless environment. However, it does not consider overhead with respect to the data transmission time, which overhead changes depending on the size (or the length) of the payload of a packet.

With the conventional packet transmission methods in the third layer (the network layer), wireless devices not having bridging functions cannot participate in the network. On the other hand, packet transmission methods using bridges in the media access control (MAC) layer are still in the process of development for application to wireless networks. When using a transmission tree in a wireless network, localized load concentration cannot be avoided.

SUMMARY OF THE INVENTION

Therefore, it is an object of the present invention to provide a packet transmission technique in an ad hoc wireless network that can achieve improved network efficiency through determination of the optimum route, while avoiding localized load concentration, regardless of the functionalities of wireless devices.

One method to achieve the object is using two or more transmission trees in an ad hoc wireless network to determine the optimum route, while appropriately distributing the workload across the network.

Another method to achieve the object is determining the optimum route taking into account the payload size of a packet, in addition to the continually changing wireless environment.

With the former method, two or more wireless basestations (bridges) behave as root bridges to create multiple transmission trees simultaneously, and each of the wireless basestations determines which tree is to be used for the currently being conducted packet transmission.

In the network, wireless basestations (regardless of whether a mobile type or a fixed type) having bridging abilities function as wireless bridges, while terminal devices (such as wireless devices) with lower abilities connect themselves to the nearest wireless basestation to participate in the network. An arbitrary mobile terminal with a bridging function may participate in the network to function as a wireless bridge.

With the latter method, the payload size of a packet is reflected in the link cost when creating and/or updating a transmission tree, regardless of existence or absence of a transmission tree, or regardless of the number of transmission trees. The optimum transmission route can be determined according to the actual conditions of the radio channel for packet transmission.

In the first aspect of the invention, a packet transmission system that includes a plurality of wireless basestations and one or more terminal devices belonging to one of the wireless basestations is provided. In this system, multiple transmission trees are employed. Each of the wireless basestations has a tree table in which identification (ID) information items of the transmission trees are recorded in association with the corresponding root bridges. When receiving a packet, each of the wireless basestations determines which transmission tree is to be used for the packet transmission, and transmits the packet to the next bridge according to the determined tree.

In determining the appropriate transmission tree, either the following means (1) or (2) may be employed.

(1) A location table is provided to each of the wireless bridges, in which table the terminal devices are recorded in association with the corresponding wireless basestations (bridges) under which the terminal devices are currently located. When receiving a packet, each of the wireless bridges identifies the first bridge under which the source terminal is currently located or the last bridge under which the destination terminal is currently located, from the location table, based on the source address or the destination address, respectively, contained in the received packet. Then, a transmission tree extending from the identified wireless bridge as the root is selected, and the packet is transmitted to the next bridge (node) along the selected transmission tree.

(2) The ID information of the currently used transmission tree, or the address information of the wireless basestation functioning as the root bridge, is contained in the packet. When receiving the packet, each of the wireless bridges determines the transmission tree from the transmission tree ID information or the root bridge address information contained in the packet.

The transmission tree used in the packet transmission system may be created based on a link cost reflecting the radio channel conditions, such as the power level of the received signal, the error rate, or the delay.

In the second aspect of the invention, a wireless basestation used in a wireless packet transmission system is provided. The wireless basestation includes:

(a) a tree table configured to record information about two or more transmission trees in association with corresponding root bridges;

(b) a packet receiving unit configured to receive a packet;

(c) a tree determination unit configured to determine the transmission tree used for the currently received packet; and (d) a packet transmitting unit configured to transmit the received packet to the next node along the determined transmission tree, referring to the tree table.

In the third aspect of the invention, a method for optimizing a packet transmission route in a wireless network is provided. The method includes the steps of:

(a) setting a plurality of transmission trees corresponding to a plurality of criteria as to the packet size at each of the wireless basestations in the network, each transmission tree describing destination information in association with a transmission route;

(b) determining the packet size when receiving the packet at one of the wireless basestations; and (c) specifying a next node to which the packet is to be transmitted, with reference to one of the transmission trees based on the determined packet size.

Since the route is determined taking into account the packet size, in addition to the transmission rate and/or other factors, the packet can be transmitted along the optimum route with reduced overhead.

In this context, the term "transmission tree" includes a routing table, spanning tree, and any suitable routing means.

BRIEF DESCRIPTION OF THE DRAWINGS

Other objects, features, and advantages of the invention will become more apparent from the following detailed description when read in conjunction with the accompanying drawings, in which

FIG. 4 illustrates an example of the tree table held in each of the wireless basestations in the wireless network;

FIG. 5 illustrates an example of the packet format of the address portion of a packet used in the wireless network shown in FIG. 3;

FIG. 10A illustrates an example of the link cost table used to create a transmission tree according to an embodiment of the invention, and FIG. 10B illustrates a conventional fixed cost table;

FIG. 13 is a diagram used to explain the packet transmission route optimizing method according to the second embodiment of the invention;

FIG. 19A and FIG. 19B are examples of the short packet routing table and the long packet routing table, respectively, in which all the nodes along the route are described;

FIG. 20A and FIG. 20B are examples of the short packet routing table and the long packet routing table, respectively, in which only the next hop is described.

DETAILED DESCRIPTION OF THE PREFERRED EMBODIMENT

The preferred embodiments of the present invention are now described in detail in conjunction with the attached drawings.

First, the first embodiment of the invention is described with reference to FIG. 3 through FIG. 12. In the first embodiment, two or more transmission trees are set up in a wireless network to optimize packet transmission.

Figure 3:
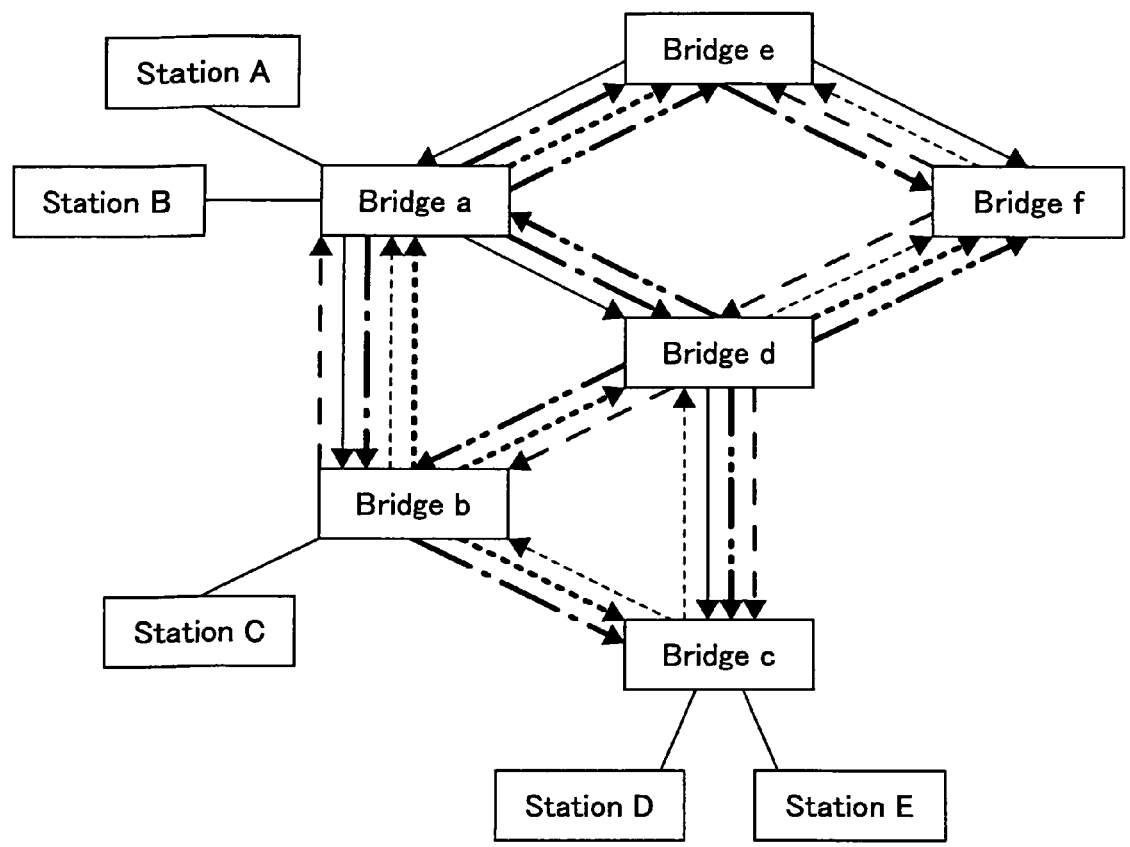
FIG. 3 is a diagram used to explain a packet transmission system according to the first embodiment of the invention, in which multiple transmission trees are created using different wireless basestations as the root stations.

FIG. 3 is a schematic diagram illustrating multiple transmission trees created in a network including multiple wireless bridges (basestations). By allowing the network to have multiple transmission trees with multiple wireless basestations functioning as the root bridges, the throughput of the entire network is improved, and the packet transmission route can be shortened. In the first embodiment, explanation is made using a wireless LAN based on the IEEE 802.11 standard as the example.

In FIG. 3, Bridges (a-f) are wireless basestaions that form a wireless network in which packets are transmitted along the transmission trees. Stations (A-E) are terminal devices, which are wireless terminals in this example. Bridges (the wireless basestations) may be either of a mobile type or a fixed type. Each of Stations A-E can be connected to one of Bridges a-f in either a wireless manner or a wired manner.

Although, in the example shown in FIG. 3, transmission trees are created using all the wireless basestations (Bridges) a-f as root bridges, it is not always necessary to use all the wireless basestations as root bridges. Inefficient transmission trees may be eliminated, taking the network size and/or the overhead into account.

Each of the wireless basestations (Bridges) a-f has a tree table, in which the identification (ID) information of each of the transmission tress is recorded in association with the root bridge, together with the adjacent bridges (nodes) along the transmission tree.

FIG. 4 illustrates an example of the tree table held by Bridge d shown in FIG. 3. The table records the ID of the transmission tree and the adjacent bridges (the previous node and the next node) along the transmission tree, for each of the root bridges.

When using multiple transmission trees in a wireless network, each of the wireless basestations (bridges) determines which transmission tree is to be used for the currently transmitted packet when a packet is received. There are two methods for determining which transmission tree.

(1) The first method is to provide a location table to each of the wireless bridges. The location table records the terminal devices in association with the corresponding bridges under which the terminal devices currently exist. When receiving a packet, each of the wireless bridges identifies the first wireless bridge to which the source terminal currently belongs or the last wireless bridge to which the destination terminal currently belongs, based on the source address or the destination address contained in the received packet, with reference to the location table. Then, a transmission tree having the identified wireless bridge as the root is selected, and the packet is transmitted to the next bridge (node) according to the selected transmission tree.

(2) The second method is to write information about which transmission tree is used in the packet. The information may be written by the source terminal or the wireless bridge that first receives the packet from the source terminal. As the information, the transmission tree ID or the address of the root bridge of the transmission tree may be written.

The first and second methods are described in more detail below. When the transmission tree is determined, the wireless bridge transmits the packet to the next node (bridge) according to the transmission tree. By using multiple transmission trees in the wireless network, route optimization is performed efficiently, and the packet transmission route can be shortened. In addition, load concentration on a specific wireless bridge can avoided, and the network efficiency can be improved as a whole.

FIG. 5 illustrates an example of the address format of a packet transmitted and received in the wireless network shown in FIG. 3. The top line of FIG. 5 shows the address fields of a packet transmitted from a terminal device (Station) to a wireless bridge (Bridge), the middle line of FIG. 5 shows the address fields of a packet transmitted between wireless bridges, and the bottom line of FIG. 5 shows the address fields of a packet transmitted from a wireless bridge (Bridge) to a terminal device (Station).

The source address represents the address of wireless communication equipment that first generates and transmits the packet. The destination address represents the address of wireless communication equipment to which the packet is finally addressed. The address of a transmitting node represents the address of wireless communication equipment that transmits the packet along the transmission tree, and the address of a receiving node represents the address of wireless communication equipment that receives the packet along the transmission tree.

The symbol "DS" represents wireless communication equipment, "To" indicates a direction to the receiving side, and "From" indicates a direction from the transmitting side. If the field "To DS" is "0", a terminal device (wireless terminal) is on the receiving side. If the field "To DS" is "1", a wireless bridge is on the receiving side. If the field "From DS" is "0", a wireless terminal is on the transmitting side, and if the field "From DS" is "1", a wireless bridge is on the transmitting side. If both fields "To DS" and "From DS" are "1", then the packet is transmitted between adjacent wireless bridges. By inserting the "To DS" field and the "From DS" field in the packet, it can be determined whether the packet is currently being transmitted between bridges.

If, in the network shown in FIG. 3, Station A transmits a packet addressed to Station E, the packet is first received at Bridge a to which Station A is currently connected. In this case, the address format of the packet is one indicated at the top line of FIG. 4, containing the address of Station A as the source address and the address of Station E as the destination address. The address of Bridge "a" is inserted as that of the receiving node.

Bridge "b" that has received the packet from Bridge "a" adds the self address in the address field of the transmitting node, and adds the address of Bridge "c" (which is the next node) in the address field of the receiving node.

Figure 1:
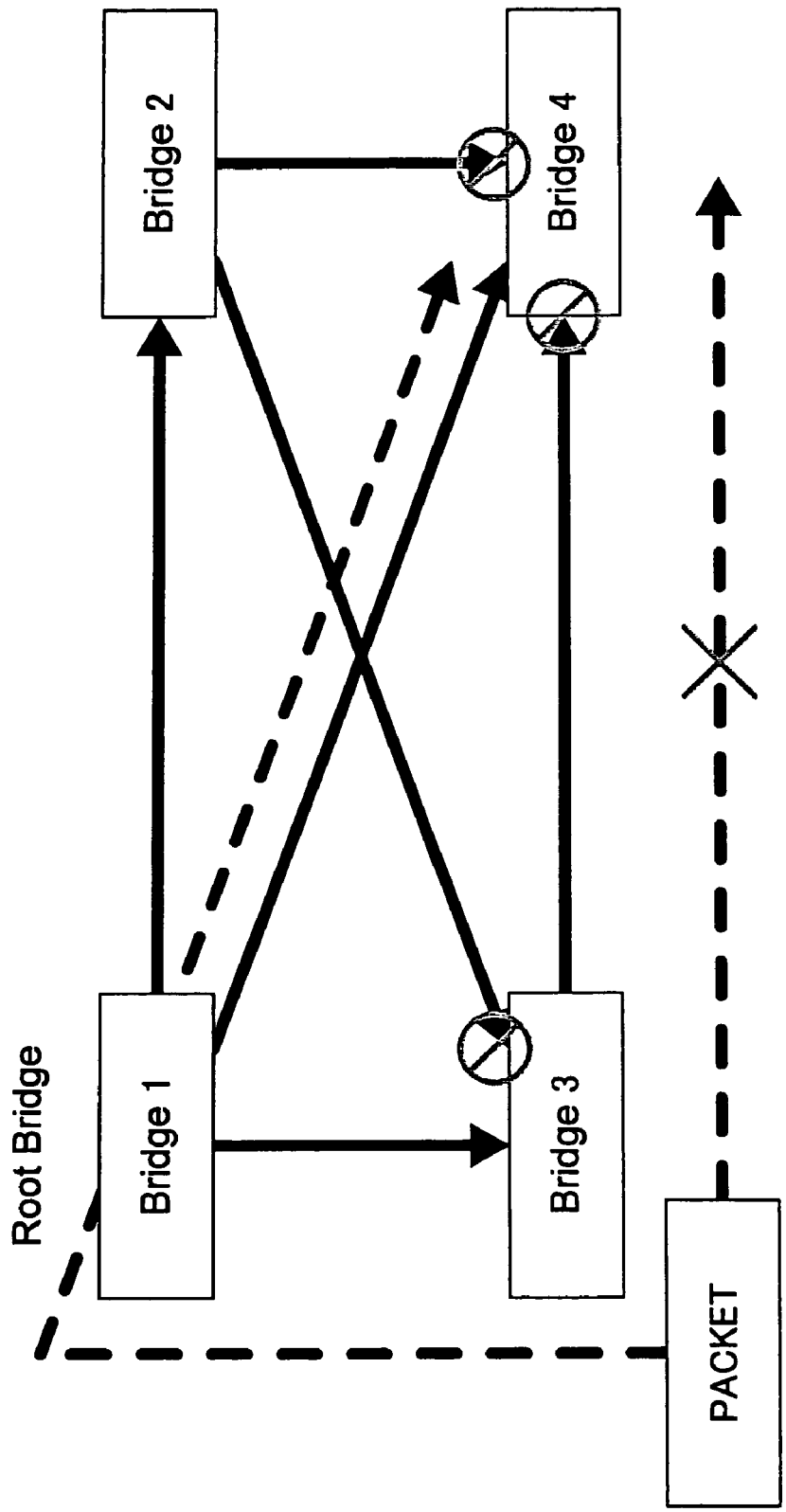
FIG. 1 illustrates an example of the nonloop transmission tree used in the conventional wired network.
Figure 2:
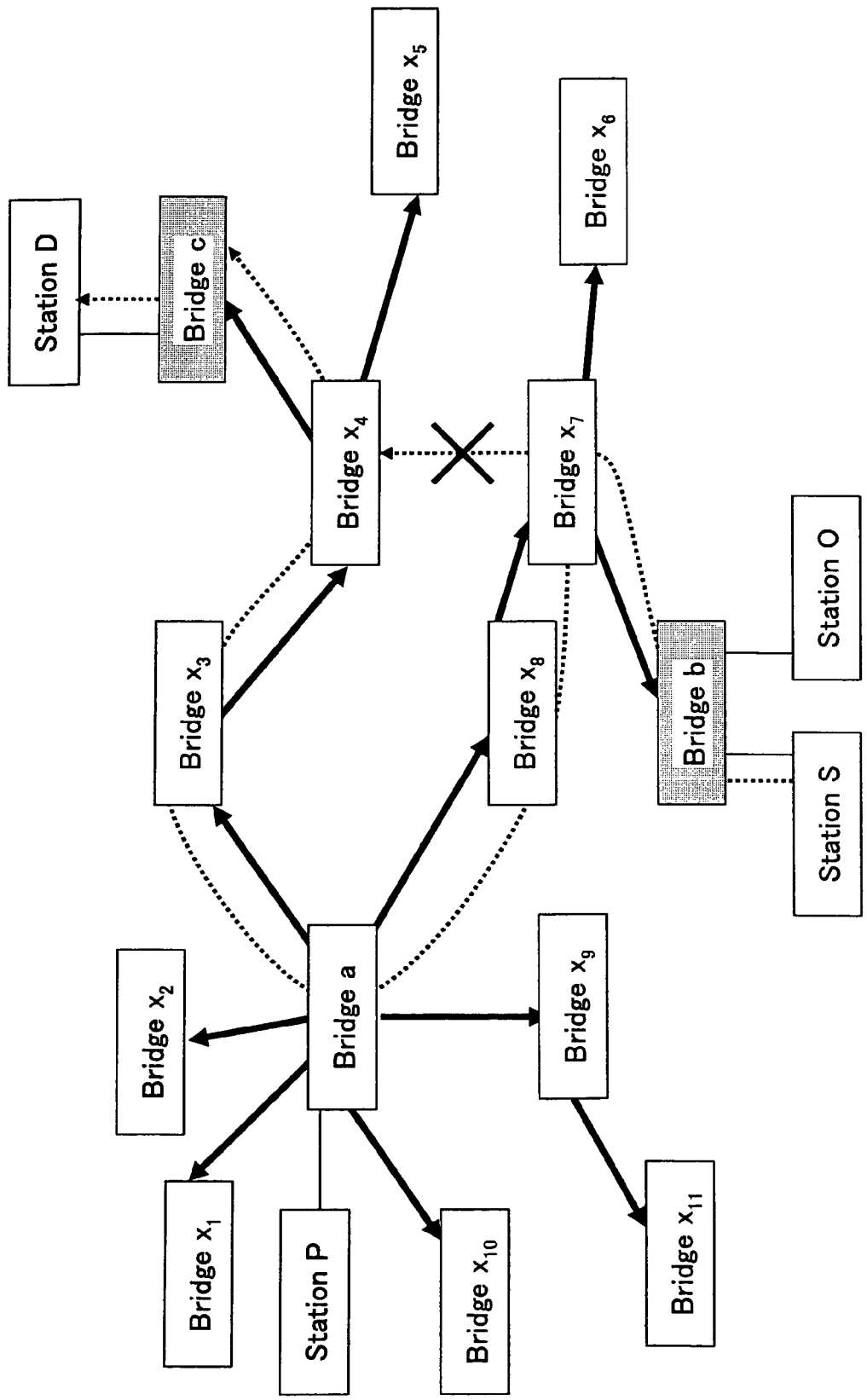
FIG. 2 illustrates an example of the transmission tree structure proposed in the conventional wireless network.
Figure 6:
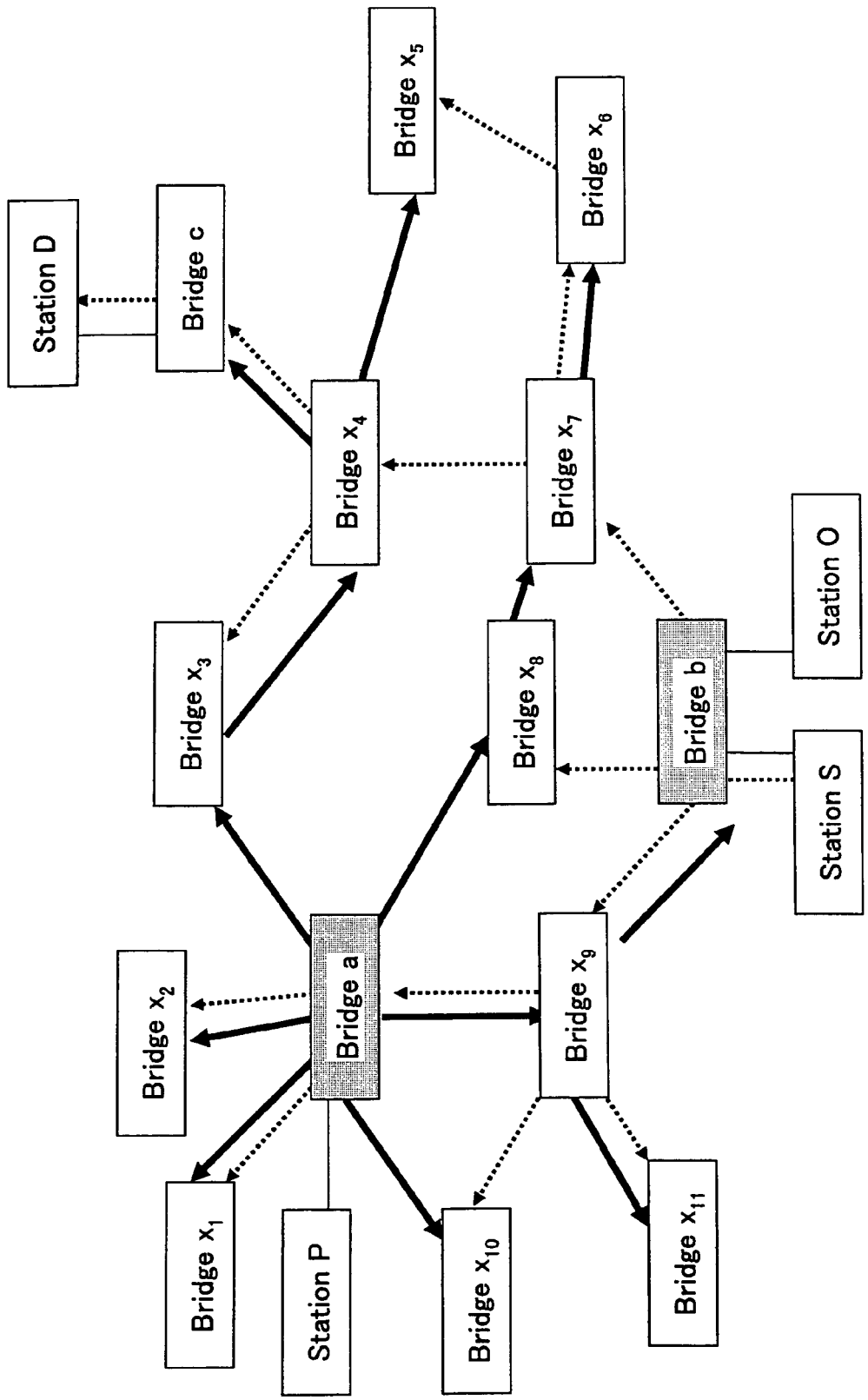
FIG. 6 illustrates an example of the transmission tree structure using multiple root bridges according to the first embodiment of the invention.

FIG. 6 is a diagram illustrating an example of multiple transmission trees which is applied to the same network topology as that shown in FIG. 2. When a packet addressed to Station D is transmitted from Station S, the transmission tree extending from root Bridge "b" and depicted by the dashed arrows is employed to transmit the packet to the destination. In this case, the packet transmission route can be greatly shortened, as compared with the conventional arrangement shown in FIG. 2, in which only a single transmission tree uses Bridge "a" as the root. Although FIG. 6 illustrates only two transmission trees with Bridge "a" and Bridge "b" as the corresponding roots for convenience sake, three or more transmission trees may be employed in the wireless network, depending on the network size or other factors, to create transmission trees more extensively.

Next, explanation is made of the above-described two methods for identifying the currently used transmission tree, using the network topology shown in FIG. 6 as an example. The two methods are (1) providing a location table to each of the wireless bridges to record terminal devices in association with wireless bridges under which the terminal devices are currently located, and (2) writing information about the transmission tree in the packet.

Figure 7:
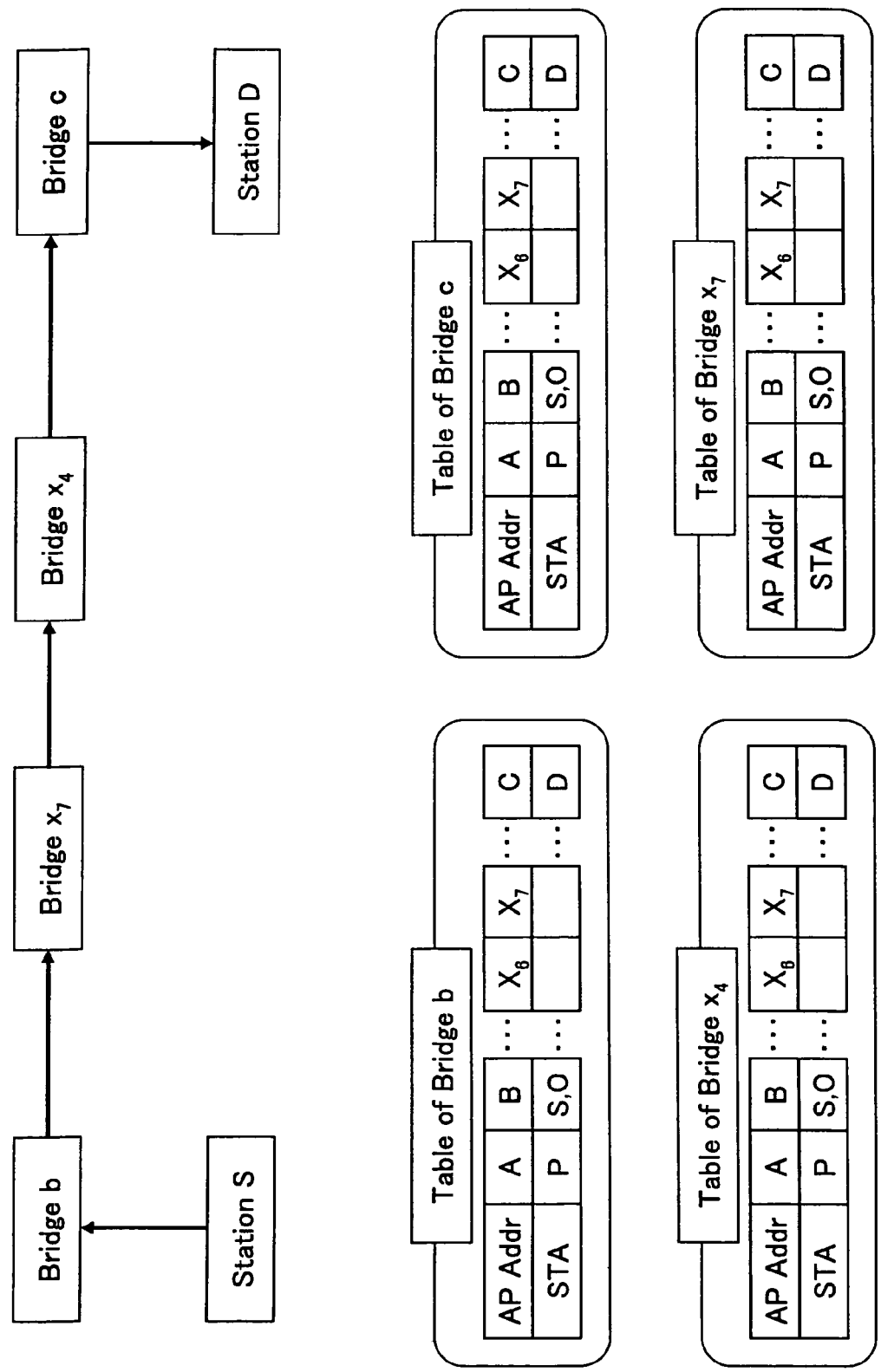
FIG. 7 illustrates an example of the location table set in each of the wireless basestations according to the first embodiment of the invention, which location table is used to identify the appropriate tree for the currently conducted packet transmission among the multiple transmission trees.

FIG. 7 illustrates an example of the location table held in each of the wireless bridges (basestations). The wireless basestations exchange information about the terminal devices currently connected to one of the wireless basestations on the network to create and update the location tables. In the example shown in FIG. 7, each of the location tables held by one of the wireless bridges records the address A of Bridge "a" in association with Station P currently existing under Bridge "a", the address B of Bridge "b" in association with Stations S and O currently existing under Bridge "b", and the address C of Bridge "c" in association with Station D currently existing under Bridge "c". Although not shown in FIG. 7, all the terminal devices (Stations) currently existing under one of the wireless basestations (Bridges) are listed in the location table. With the location table, each of the wireless basestations can determine what device is currently located under which wireless basestation.

When a packet is transmitted from Station S to Station D in the network shown in FIG. 6, Station S adds the self address as the source address, and adds the address of Station D as the destination address, adds address B of Bridge "b" as the receiving node address to the address fields of the packet.

Upon receiving the packet from Station S, Bridge "b" transmits the packet to the next node(s) along the transmission tree extending from Bridge "b" itself as the root. Each of the nodes (Bridges) having received the packet checks the address fields of the packet, and determines that the source terminal is Station S. These Bridges also check the location table to determine that Station S currently exists under Bridge "b", select the transmission tree extending from Bridge "b" as the root from the tree table, and transmit the packet to the next node along the selected transmission tree.

For example, Bridge B transmits the packet to Bridges x7, x8, and x9 along the transmission tree indicated by the dashed arrows. Bridge x7 selects the transmission tree extending from Bridge b as the root, based on the location table and the address information of the packet, and transmits the packet to Bridges x4 and x6. Bridge x8 also selects the transmission tree, and determines that the next node does not exist on the selected tree. In this case, Bridge x8 discards the packet. Bridge x9 performs the same process as Bridge x7. In this manner, the packet is finally relayed to Bridge "c", and delivered to Station D located under Bridge "c".

If a transmission tree extending from the bridge of the transmitting side is employed, as in the above-described example, the packet is transmitted to two or more nodes at a branch point. This arrangement may be acceptable for broadcasting a packet without a specific destination. However, when unicasting a packet addressed to a specific destination along the transmission tree extending from the bridge of the transmitting side, the packet is transmitted to bridges irrelevant to the destination. To avoid such inefficiency, the following measures may be employed.

(a) When unicasting a packet toward a specific destination, select a transmission tree extending from the root bridge connected to the destination terminal (Station); and (b) Create a learning table when transmitting a packet, and use the learning table for the second and subsequent packet transmissions.

With measure (a), a packet is transmitted from Station S addressed to Station P in the network shown in FIG. 6, then the transmission tree extending from root Bridge "a" to which Station P currently belongs is selected. Each of the wireless bridges located on the transmission tree identifies this transmission tree extending from root Bridge "a", based on the destination address of the packet and the location table. By selecting the transmission tree extending from the root bridge connected to the correspondent terminal, the packet can be relayed only to the destination, tracing back the tree toward the root. In the example of FIG. 6, Bridge "b" transmits the packet only to Bridge x9, tracing back the transmission tree indicated by the bold arrows, without transmitting the packet to Bridges x7 and x8.

This arrangement can further reduce the network workload. On the other hand, when broadcasting a packet without specific destinations, or when transmitting a packet addressed to a terminal device whose basestation is unknown, a transmission tree extending from the root bridge under which the source terminal is located is selected to relay the packet to the destination(s).

A wireless bridge located at the end of the network may not have a transmission tree extending from this wireless bridge itself as the root. For example, Bridge "c" shown in FIG. 6 is a distal bridge that does not currently behave as a root bridge. In this case, each of the wireless bridges first checks the destination address (of Station D in this example), and if there is not a transmission tree extending from the wireless bridge as the root connected to the destination terminal, then another transmission tree extending from the wireless bridge of the transmitting side connected to the source terminal may be selected.

With measure (b), a learning table is used, in addition to the location table. Each of the wireless bridges records the previous node from which the packet generated by the source terminal specified by the source address is currently relayed. For creation of the learning table, any known method may be employed.

Figure 8:
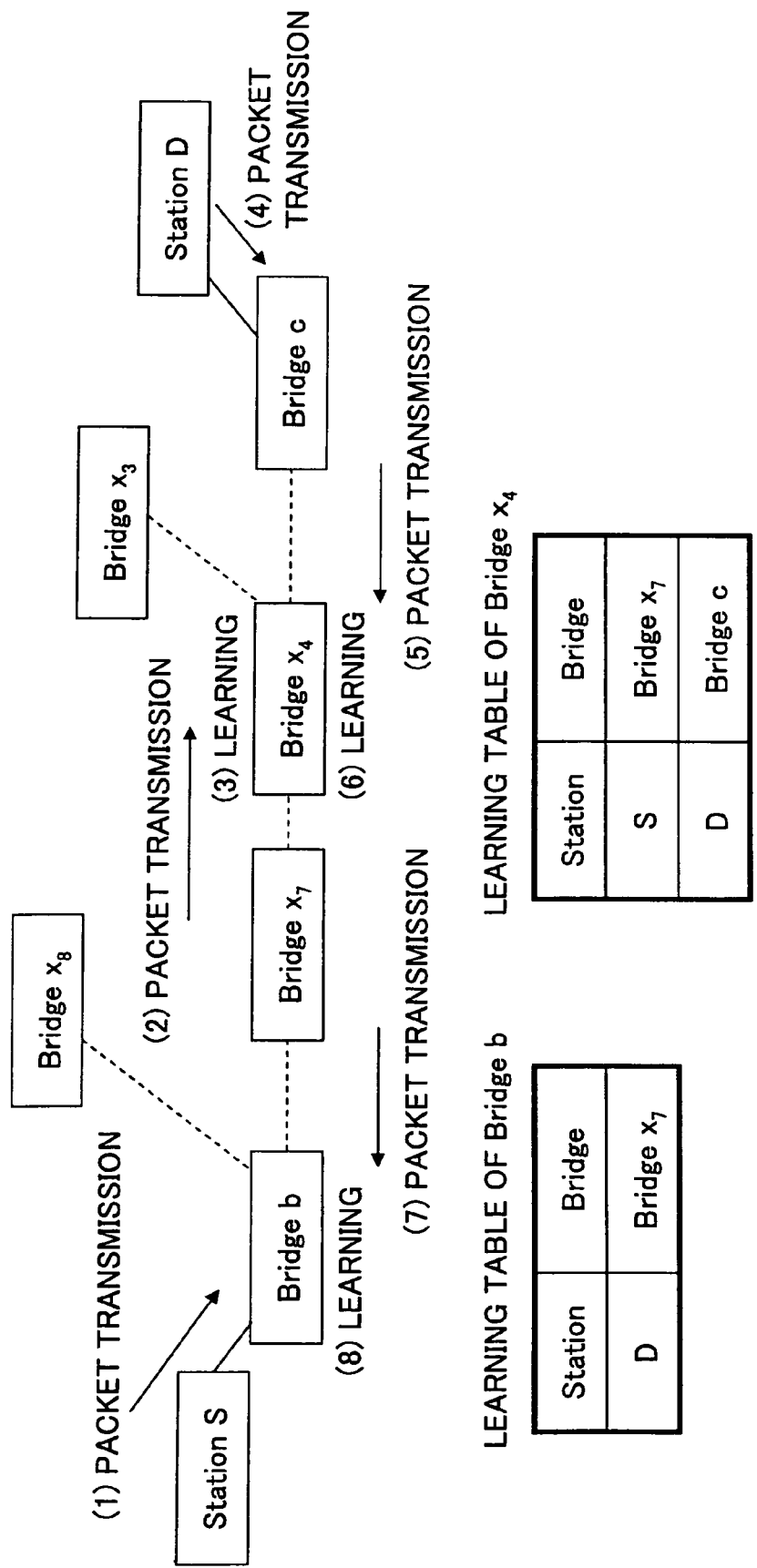
FIG. 8 is a diagram used to explain creation of a learning table at each of the wireless basestations according to the first embodiment of the invention.

FIG. 8 illustrates an example of the learning table. When transmitting a packet addressed to Station D from Station S in the network shown in FIG. 6, the packet is first supplied to Bridge "b" (as indicated by the arrow (1)), and transmitted to Bridge x4 via Bridge x7, along the transmission tree extending from root Bridge "b" (as indicated by the arrow (2)). At Bridge x4, it is determined that the packet is generated at Station S from the source address of the packet, and that the previous node is Bridge x7 from the transmitting address of the packet. Then, Bridge x4 records these information items in the learning table (at step (3)). For example, the address or the ID of the source terminal (Station S) is written in association with the address or the ID of the previous node (Bridge x7). Then, the packet reaches the destination terminal (Station D) via the last Bridge "c".

Station D then sends a reply packet to Station S (as indicated by the arrow (4)). The reply packet is transmitted from Bridge "c" to Bridge "x4" (as indicated by the arrow (5)). Bridge x4 determines that the source terminal is Station D and the reply packet is relayed from Bridge "c", based on the address information contained in the reply packet, and records these information items in the learning table (step (6)), as exemplified in FIG. 8.

The reply packet is further transmitted from Bridge x4 to Bridge "b", via Bridge x7 (as indicated by the arrow (7)). Bridge "b" records the information pair about the source terminal (Station D) and the previous node (Bridge x7) in the learning table (step (8)), and supplies the packet to Station S.

Although not illustrated in FIG. 8, the rest of the bridges (Bridge x7 and Bridge c in this example) along the tree also record the information about the source terminal and the previous node in the learning tables when receiving a packet. When a packet is first received before the learning, Bridge x8 and Bridge x3 located on the branches of the tree also record the information items in the learning table.

When Bridge "b" again receives another packet addressed to Station D, Bridge "b" transmits this packet only to Bridge x7, without transmitting the packet to Bridge x8 or other branches, because Bridge "b" already has information that Station D is located in the direction of Bridge x7. Similarly, when Bridge x4 receives the packet addressed to Station D next time, it transmits the packet only to Bridge "c", without transmitting to other branches. With this arrangement, wasting of packets can be greatly reduced even if a transmission tree extends from the root bridge on the transmitting side.

With method (1) providing a location table to each of the wireless basestations (bridges), when a terminal device is newly connected to one of the wireless basestations, or when a terminal device moves and connects itself to another wireless basestation, the wireless basestation transmits a message packet reporting the newly connected terminal device along the transmission tree by broadcasting. Upon receiving the message packet, each of the wireless basestations records the newly connected terminal device in the location table. At this time, the wireless basestation may be configured to record the source bridge that transmitted the message packet, in association with the previous node, in the learning table.

With this arrangement, the location table and the learning table are simultaneously updated every time a terminal device is newly connected to a wireless basestation, and the optimum routing along the transmission tree can be performed more efficiently.

Next, explanation is made of the second method (2) for determining the currently used transmission tree, with reference to FIG. 9. In the second method, information about which transmission tree is used for the current packet is contained in the packet.

Figure 9A:
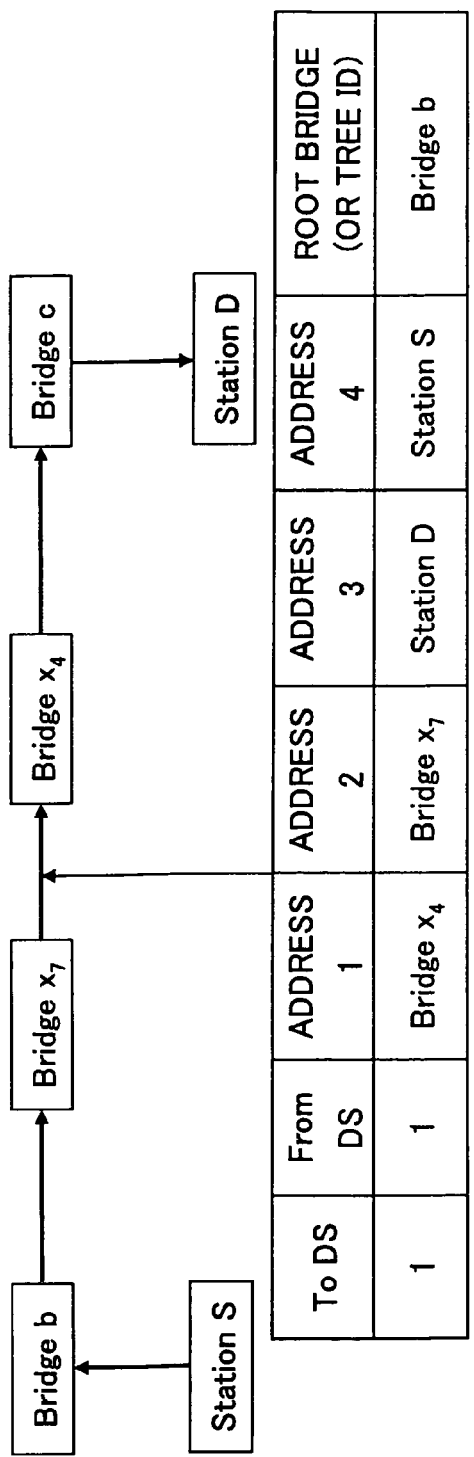
FIG. 9A and FIG. 9B illustrate examples of the format of a packet header having an additional field for storing the tree ID information or the root bridge address information in order to identify the currently used transmission tree.
Figure 9B:
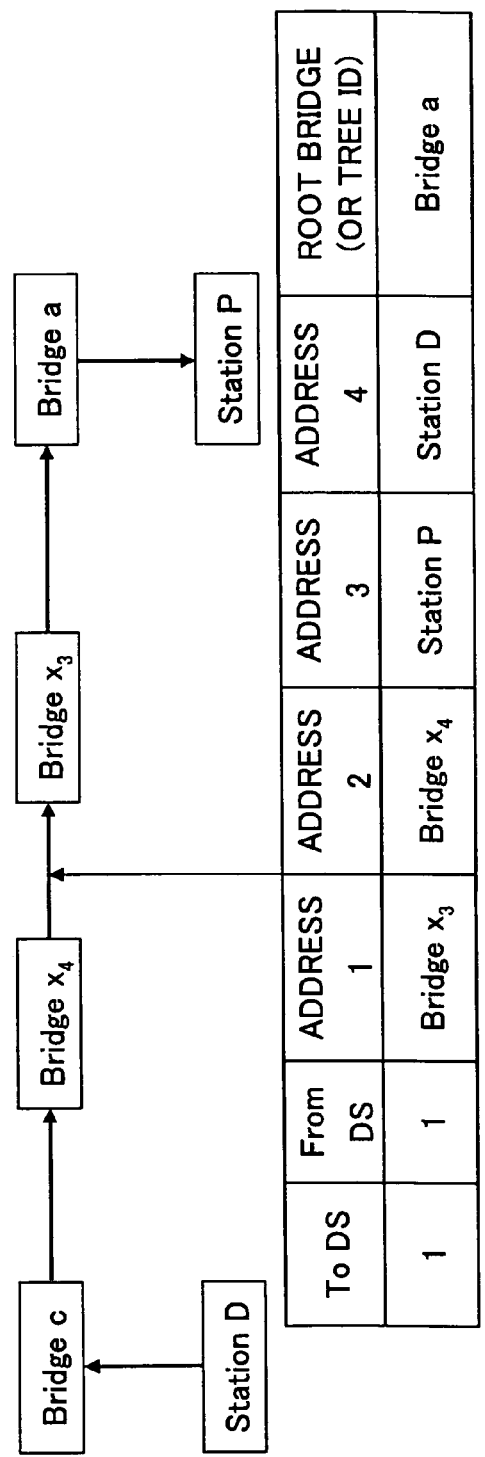

FIG. 9A illustrates an example of the packet format when using a transmission tree extending from the root bridge on the transmitting side, and FIG. 9B illustrates an example of the packet format when using a transmission tree extending from the root bridge on the destination side. The packet format shown in FIG. 9A is used when the second method is used solely, and the packet format shown in FIG. 9B is advantageous when the second method is combined with the first method (using a location table).

It is assumed that a packet is transmitted from Station S located under Bridge "b" to Station D located under Bridge "c" in the network shown in FIG. 6. Unlike the first method, each of the wireless basestations (bridges) on the network cannot know which terminal devices are currently located under which bridges. To make up for this inconvenience, information about the currently used transmission tree or the address of the root bridge is inserted in the packet on the transmitting side. Each of the wireless basestations (Bridges) receiving the packet determines the transmission tree from the information contained in the packet, and transmits the packet to the next node.

In the example shown in FIG. 9A, Bridge "b" that first receives the.packet from Station S designates the transmission tree extending from Bridge "b" functioning as the root. Bridge "b" adds the self address as the root information in the extra field of the packet, or alternatively, adds the ID information of the transmission tree. The transmission tree or the root bridge may be designated by Station S when generating and transmitting the packet. In this case, Station S adds the address information of Bridge "b", to which Station S currently belongs, in the extra field of the packet.

Bridge x7 located on the transmission tree receives the packet from the root bridge, and checks the extra field of the packet to determine that the packet is being transmitted along the transmission tree extending from root Bridge "b". Bridge x7 adds the address of the next node, which is Bridge X4 in this example, as the receiving node address in the address field 1 of the packet, and adds the self address as the transmitting address in the address field 2.

If a wireless basestation (bridge) is located at a branch of the transmission tree, the packet is to be transmitted to all the branched paths if only the tree information or the root bridge information contained in the packet is used. To avoid this inefficiency, it is preferable for the second method to use a learning table shown in FIG. 8, together with the information contained in the packet. In this case, the source terminal indicated by the source address and the previous node indicated by the transmitting address are paired and recorded in the learning table. Since it is common in wireless communication to receive acknowledge or replay data from the destination, a packet addressed to the same destination can be transmitted in the exact direction to which the target terminal device (destination) is located, without multicasting from the branch, at the second and subsequent transmissions.

In the example shown in FIG. 9B, the address of the last bridge under which the destination terminal is currently located is written as the root bridge information in the extra field of the packet. To realize this arrangement, each of the wireless basestations has a location table. When a wireless basestation (referred to as the first bridge) receives a packet from a terminal device, the first bridge identifies the last bridge, to which the destination terminal currently belongs, using the location table. Then, the first bridge adds the address of the last bridge or the ID information of the transmission tree extending from the last bridge (root bridge) to the extra field of the packet, and transmits the packet to the next node along the route tracing back the designated transmission tree. The next and the subsequent node (bridge) can further transmit the packet toward the destination, with reference to the tree table and the address information contained in the packet, without checking the location table.

Figure 11:
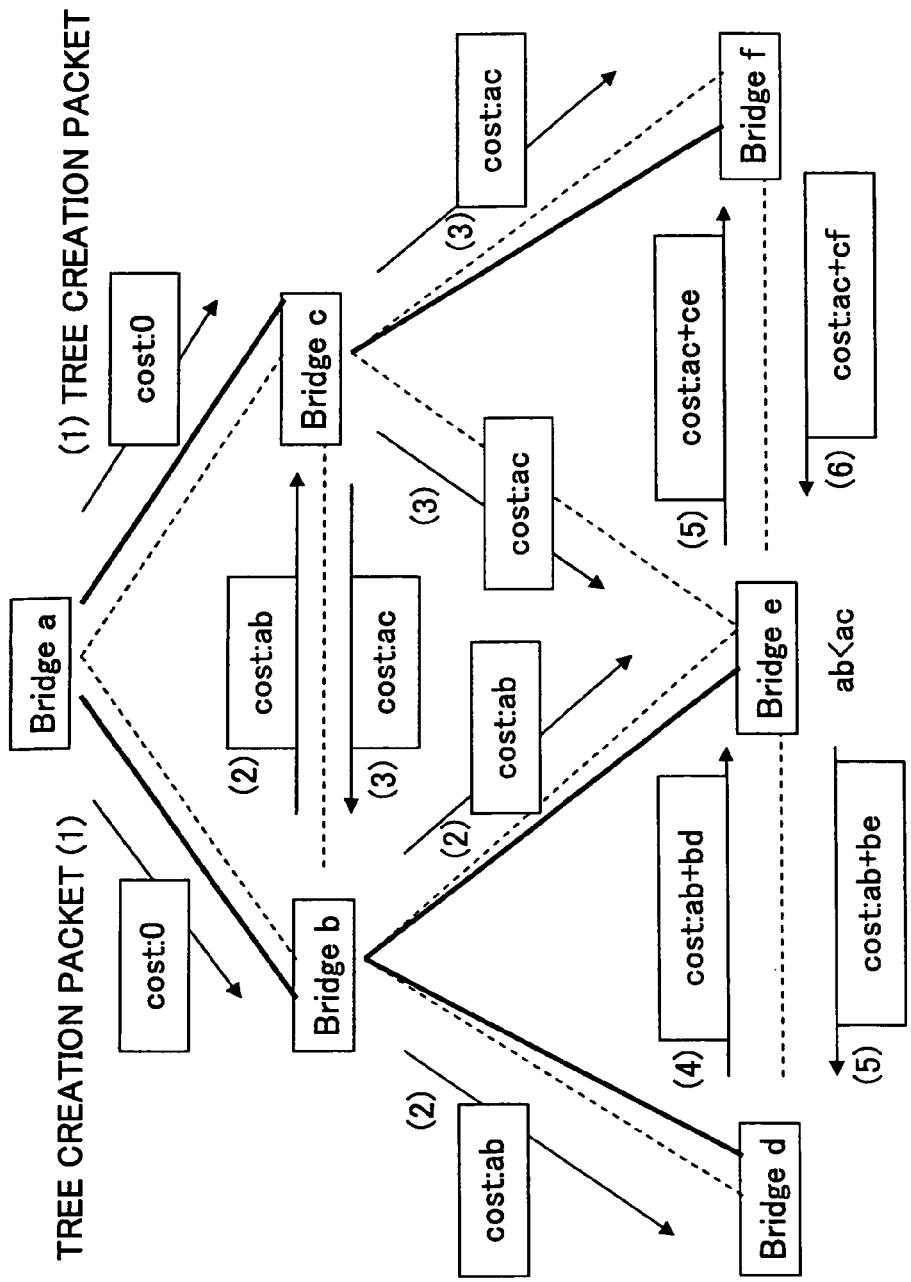
FIG. 11 is a diagram used to explain how the transmission tree is created.

Next, explanation is made of creation of a transmission tree in conjunction with FIG. 10 and FIG. 11. In the first embodiment, the transmission tree is created based on cost estimation taking the wireless environment into account.

FIG. 10A is an example of the cost table used to create a transmission tree in this embodiment, and FIG. 10B is the link cost scheme defined in the IEEE 802.1t. Conventionally, a transmission tree is created in a wired network, based on the number of hops or a fixed transmission rate, as shown in FIG. 10B. However, in a wireless packet transmission network, the transmission rate may vary because the modulation scheme is adjusted according to the conditions of the wireless channel, and because packet errors occur more often than in the wired network. Unlike the conventional wired bridges with little cross talk, the link cost for wireless communication cannot be determined based only on the number of hops.

Under these circumstances, in the first embodiment, the link cost is adjusted according to the conditions of the wireless channel between wireless interfaces or the network traffic when creating a transmission tree.

For example, the signal power level received from the adjacent bridge and/or the error rate are reflected in the cost estimation. In the cost table shown in FIG. 10A, the column of "Bridge" represents the nearby bridge ID located near the target bridge, the column of "Signal" represents the signal power level received from the nearby bridge, the column "Queue size" represents the transmit queue size added to the message packet transmitted when creating a transmission tree, and the column "Error Rate" represents the packet receipt error rate. Based on the power level of the message packet received at the target bridge, the modulation scheme used on the link between the interfaces may be determined, and the transmission rate may be further determined from the modulation scheme.

Using these parameters, the cost between the target bridge and the adjacent (nearby) bridge is estimated by the following equation, using normalization factors $\alpha$, $\beta$, and $\gamma$.

$$\text{Cost} = \alpha*(\text{Signal}) + \beta*(\text{Queue size}) + \gamma*(\text{Error Rate})$$

FIG. 11 illustrates how a transmission tree is created, taking the link cost into account. The dashed lines in the figure denote links between adjacent bridges that can physically communicate with each other. For example, when Bridge "a" behaves as a root bridge to create a transmission tree, it transmits a tree creation packet to adjacent bridges (as indicated by the arrows (1)). The tree creation packet has a field in which a link cost is to be written. The tree creation packet first transmitted from Bridge "a" has cost zero.

Upon receiving the tree creation packet, Bridge "b" calculate a link cost "ab" between Bridge "a" and Bridge "b", based on the cost table shown in FIG. 10A, adds the estimated cost "ab" to the cost field of the tree creation packet, and transmits the packet to adjacent bridges (as indicated by the arrows (2)).

Similarly, Bridge "c", which has received the tree creation packet from Bridge "a", calculates a link cost "ac" between Bridge "a" and Bridge "c", adds the calculated cost "ac" to the cost field of the packet, and transmits the packet to adjacent nodes (as indicated by the arrows (3)).

When Bridge "c" receives the tree creation packet from Bridge "b", Bridge "c" compares cost "ac", which is the link cost between Bridge "c" and the root Bridge "a", and cost "ab+bc", which is the link cost calculated from the tree creation packet from Bridge "b", and discards the link with a higher cost. For example, if ac<ab+bc, then the path extending from Bridge "a" via Bridge "b" to Bridge "c" is not employed. By repeating this process at Bridge "d" (the arrow (4)), Bridge "e" (the arrows (5)), and Bridge "f" (the arrow (6)), a non-loop tree indicated by the solid line in FIG. 11 is created.

The transmission tree can be created or updated at prescribed time intervals, or whenever a wireless terminal device with a bridge function participates in the network to behave as a bridge. The information about the newly created or update transmission tree is supplied to the wireless basestations (bridges) on the network, and each of the basestations updates the tree table. By reflecting the wireless channel conditions in the link cost, a transmission tree can be created adaptively in agreement with the actual traffic or the network topology.

Figure 12A:
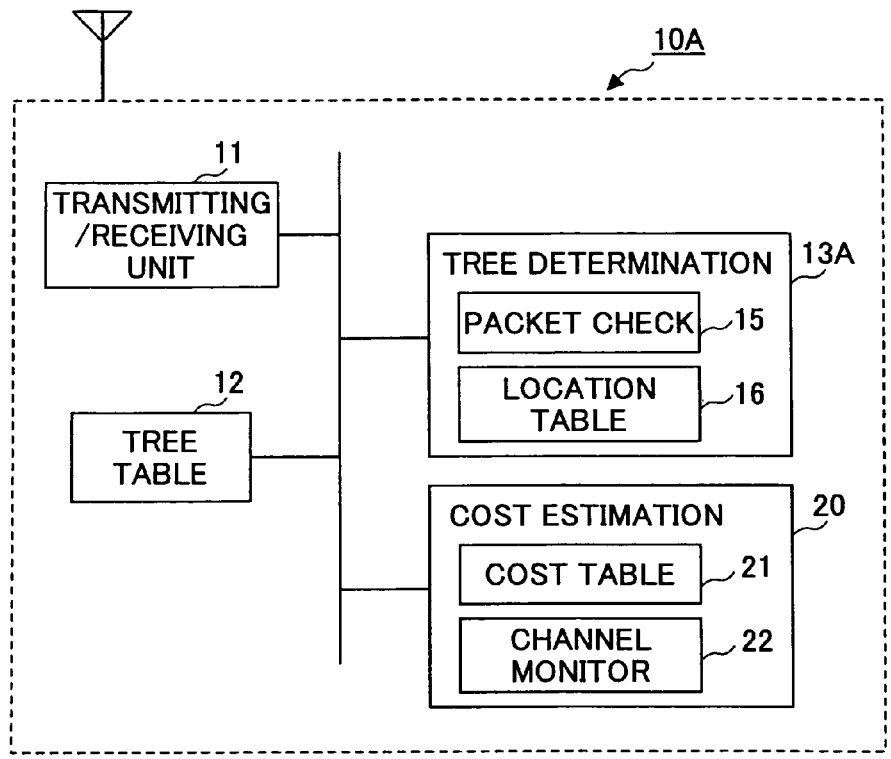
FIG. 12A and FIG. 12B are block diagrams of wireless basestations according to the first embodiment of the invention.
Figure 12B:
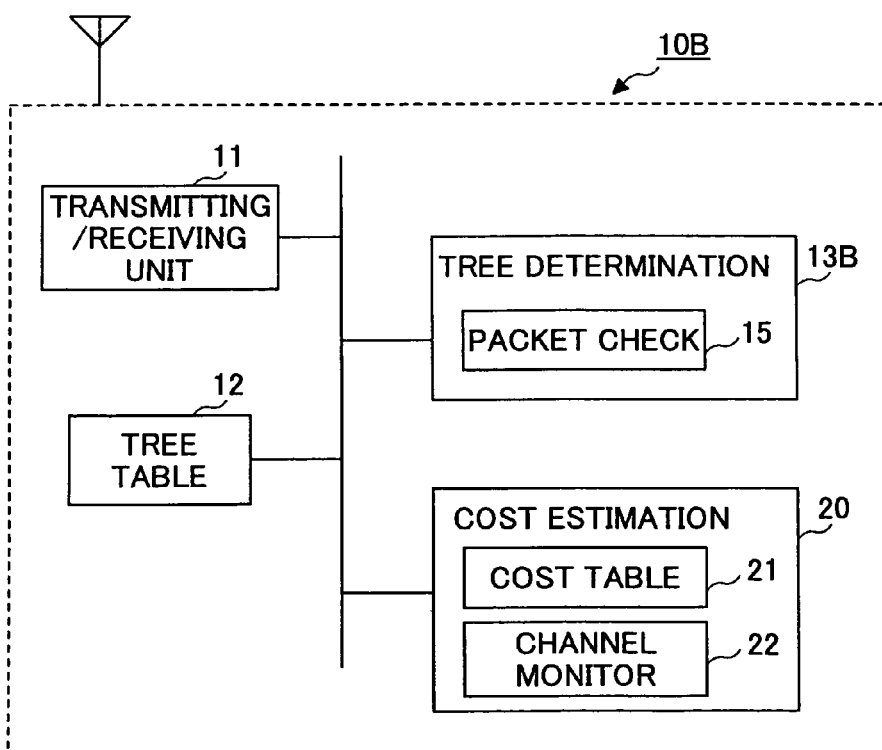

FIG. 12A and FIG. 12B are schematic block diagrams illustrating wireless basestations 10A and 10B, respectively, according to the first embodiment of the invention. The structure shown in FIG. 12A is employed when the location table is used, and the structure shown in FIG. 12B is employed when the tree ID information or the root bridge information contained in the packet is used. Each of the wireless basestations 10A and 10B has a tree table 12 in which information about two or more transmission trees is recorded in association with the root bridges of the trees, and a transmitting and receiving unit 11. The transmitting and receiving unit 11 transmits a packet to the next node according to the determined transmission tree, with reference to the tree table 12. The wireless basestations 10A and 10B also have tree determination units 13A and 13B, respectively.

In the structure shown in FIG.12A, the tree determination unit 13A includes a packet checking unit 15 and a location table 16. Based on the source address or the destination address contained in the packet and identified by the packet checking unit 15, as well as on the location table 16, the tree determination unit 13A determines a root bridge, and selects a transmission tree referring to the location table 16. The transmitting and receiving unit 11 transmits a packet to the next node by following the tree in the forward or backward direction.

In the structure shown in FIG. 12B, the tree determination unit 13B includes a packet checking unit 15, which extracts the transmission tree ID from the packet to determine the transmission tree to be used.

Each of the wireless basestations 10A and 10B also has a cost estimation unit 20. The cost estimation unit 20 includes a cost table 21 and a channel monitoring unit 22. The channel monitoring unit 22 monitors the channel conditions and updates the parameters (cost values) recorded in the cost table 21. When the transmitting and receiving unit 12 receives a tree creation packet, the cost estimation unit 20 adds the cost from the previous node to the wireless basestation 10A (or 10B) to the tree creation packet, consulting the cost table 21. The transmitting and receiving unit 11 then transmits the tree creation packet to adjacent nodes. If the wireless basestation 10A (or 10B) becomes a root bridge, the transmitting and receiving unit 11 generates and transmits a tree creation packet with cost zero.

Although only a single interface and a single transmitting and receiving unit 11 are depicted in FIG. 12A and FIG. 12B for simplification, a backbone interface used for transmission between wireless bridges and an access interface used for communication with terminal devices (Stations) located under the wireless basestation 10A (or 10B) may be provided separately.

The first embodiment has been described based on the example of a complete wireless network. However, a portion of the network may be wired. For example, a terminal device may be connected to one of the wireless basestations by a cable. A mobile terminal with a bridge function may be incorporated as a wireless basestation in the network. When such a mobile terminal participates in the network, a transmission tree is created dynamically and adaptively, reflecting the current wireless channel conditions. Using two or more transmission trees, route optimization and load distribution can be performed more efficiently.

Although the first embodiment has been explained using the wireless LAN based on the IEEE 802.11 standard, the invention is not limited to this example and is applicable to a wireless network of a WCDMA scheme or the next generation wireless communication scheme. In addition, by adding an interface and a protocol converting function to each of the wireless basestations, the first embodiment can be applied to a wireless packet network in which network segments with different communication schemes coexist.

A portion or all of the transmission trees may be put together to reduce the workload required for maintaining multiple transmission trees. In this case, information about the combined trees is added to the extra field of the packet and/or the tree table.

FIG. 13 through FIG. 21 illustrate route optimization performed in a wireless network according to the second embodiment of the invention. In the second embodiment, the packet size or length (more particularly, the payload size or length) is considered, in addition to the transmission rate or other radio channel conditions, when estimating a link cost.

FIG. 13 is a schematic diagram illustrating an example of a frame transmission scheme based on the IEEE 802.11a standard. In many wireless communications systems, a packet has a header of a fixed length and a payload of a variable length. Negotiation time required for packet transmission and header transmission time become overhead with respect to actual data transmission. The amount of overhead varies depending on the transmission rate and the payload size. Less overhead is more preferable for packet transmission.

In the example shown in FIG. 13, every time a data frame has been transmitted, an acknowledgement (Ack) is received after a short interval called a short interframe spacing (SIFS). Then, after a contention window (CW) for selecting a backoff time, the next data frame is transmitted. Assuming that the payload is x bytes and the date rate is k Mbps, then header transmission time for a packet is about 20 µs, payload transmission time is about 8x/k µs, SIFS is about 16 µs, Ack transmission time is about (16+134/k) µs, and the CW period is 101.5 µs. Consequently, time required for one-frame transmission is about $$[(20+16+16+101.5)+(8x+134)/k] \,\mu s.$$

The value k [Megabit] expressing data transmission rate varies depending on the modulation scheme and/or the coding rate employed according to the radio wave environment between wireless basestations (or access points). For example, with high-intensity radio waves, a higher bit rate is employed, and with lower intensity, a lower bit rate is employed. In the example of FIG. 13, the transmission rate is selected from 6 Mbps and 27 Mbps, depending on the radio environment, for simplification purposes. It is needless to say that in the actual transmission three or more transmission rates can be set.

If the payload of a packet is 1000 bytes (x=1000), time required for packet transmission in the 6M mode is about 1510 µs, according to the above-described formula. In the 27M mode, it become about 454 µs.

If the payload of a packet is 100 bytes (x=100), then 6M-mode packet transmission time becomes 310 µs, and 27M-mode packet transmission time becomes 189 µs.

Figure 14:
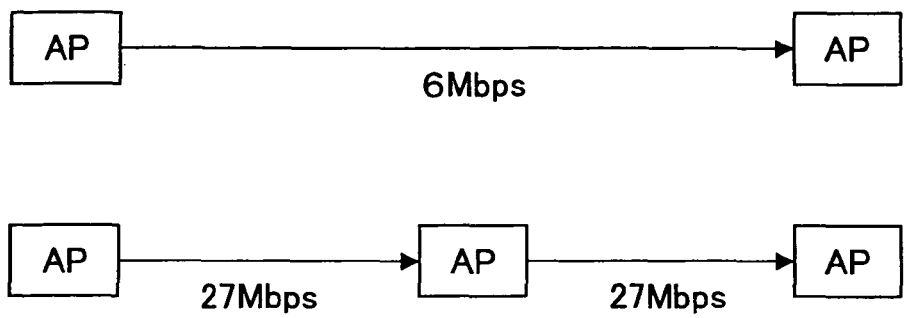
FIG. 14 is a diagram used to explain the relation between the payload size and the optimum route.

FIG. 14 illustrates the relation between the payload size and the optimum route. Consideration is made of two cases, transmitting packets at 6 Mbps data rate with a single hop and transmitting packets at 27 Mbps data rate with 2 hops.

If 1-hop transmission is performed for 1000 bytes payload on the 6 Mbps channel, the transmission time (required for one frame) is about $$1510[\mu s]*1[hop]=1510[\mu s].$$

This can be converted to data rate of about 5.3 Mbps.

If 2-hop transmission is performed for the same 1000-byte payload on the 27 Mbps channel, one-frame transmission time becomes $$454[\mu s]*2[hop]=908[\mu s],$$

which can be converted to data rate of about 8.6 Mbps.

This means that it is advantageous for a long packet (with a greater payload size) to select a higher bit-rate route even if the number of hops increases.

On the other hand, when 1-hop transmission is performed for 100-byte payload on the 6 Mbps channel, one frame transmission time becomes about $$310[\mu s]*1[hop]=310[\mu s],$$

which is converted to data rate of about 2.6 Mbps. If 2-hop transmission is performed for the same 100-byte payload on the 27 Mbps channel, one-frame transmission time becomes $$189[\mu s]*2[hop]=378[\mu s],$$

which is converted to data rate of about 1.9 Mbps.

Since, for a short packet (with a smaller payload size), the overhead ratio needed for header transmission or the like becomes higher, it is advantageous to select a route with fewer hops even if the bit rate is lower.

In this manner, when a wireless network employs adaptive modulation and adaptive coding, the optimum route varies depending on the payload size of the packet to be transmitted. Accordingly, in the second embodiment, each of the wireless basestations in the network is furnished with a packet size determination unit and multiple routing tables corresponding to different packet sizes, to take into account the packet size, in addition to the transmission rate, when creating a transmission table.

Figure 15:
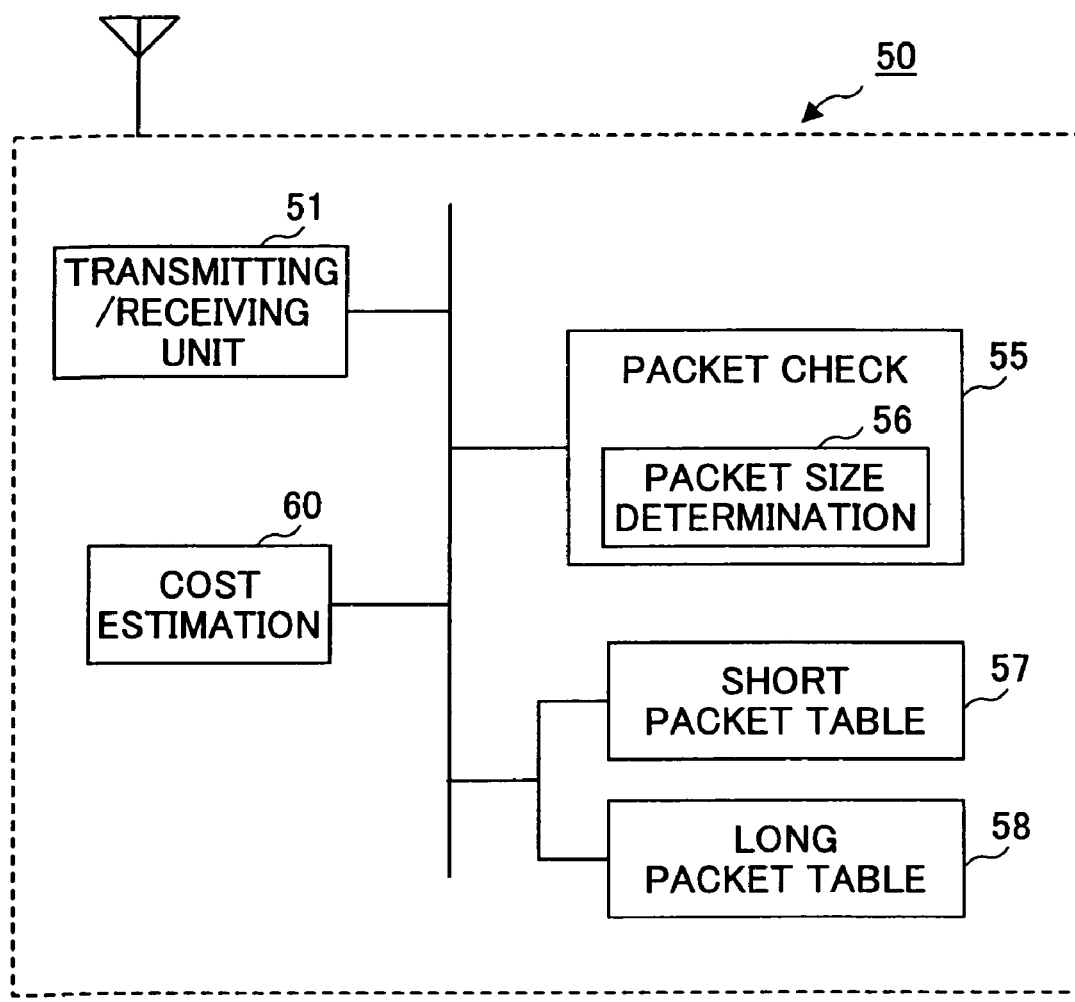
FIG. 15 is a block diagram of a wireless basestation according to the second embodiment of the invention.

FIG. 15 is a block diagram of a wireless basestation according to the second embodiment of the invention. The wireless basestation 50 has a transmitting and receiving unit 51, a packet size determination unit 56 configured to determine the size or length of a packet or the payload, a short packet table 57 used when the packet size is at or below a prescribed reference value and for recording short packet routes in association with destinations, and a long packet table 58 used when the packet size is above the prescribed reference value and for recording long packet routes in association with destinations. The transmitting and receiving unit 51 transmits the packet to the next node, with reference to either the short packet table 57 or the long packet table 58, depending on the packet size determined by the packet size determination unit 56.

Although in FIG. 15 only two routing tables (the short packet table 57 and the long packet table 58) are illustrated, three or more routing tables may be furnished, according to the criteria set for the packet size. In addition, these routing tables are examples or a part of multiple transmission trees used in the packet transmission system.

Upon receiving a link cost request, such as a route search packet or a tree creation packet, the cost estimation unit 60 calculates a link cost between the previous node and the wireless basestation 50 itself, taking into account the current transmission rate, for each of the short-packet case and the long-packet case. Then, the cost estimation unit 60 adds the two estimation results to the route search packet or the tree creation packet, and transmits the packet to adjacent wireless basestations. The wireless basestation 50 updates the short packet table 57 and the long packet table 58 based on the routes selected from the cost information in the network.

The wireless basestation 50 may be either a mobile type or a fixed type, as in the first embodiment.

Figure 16:
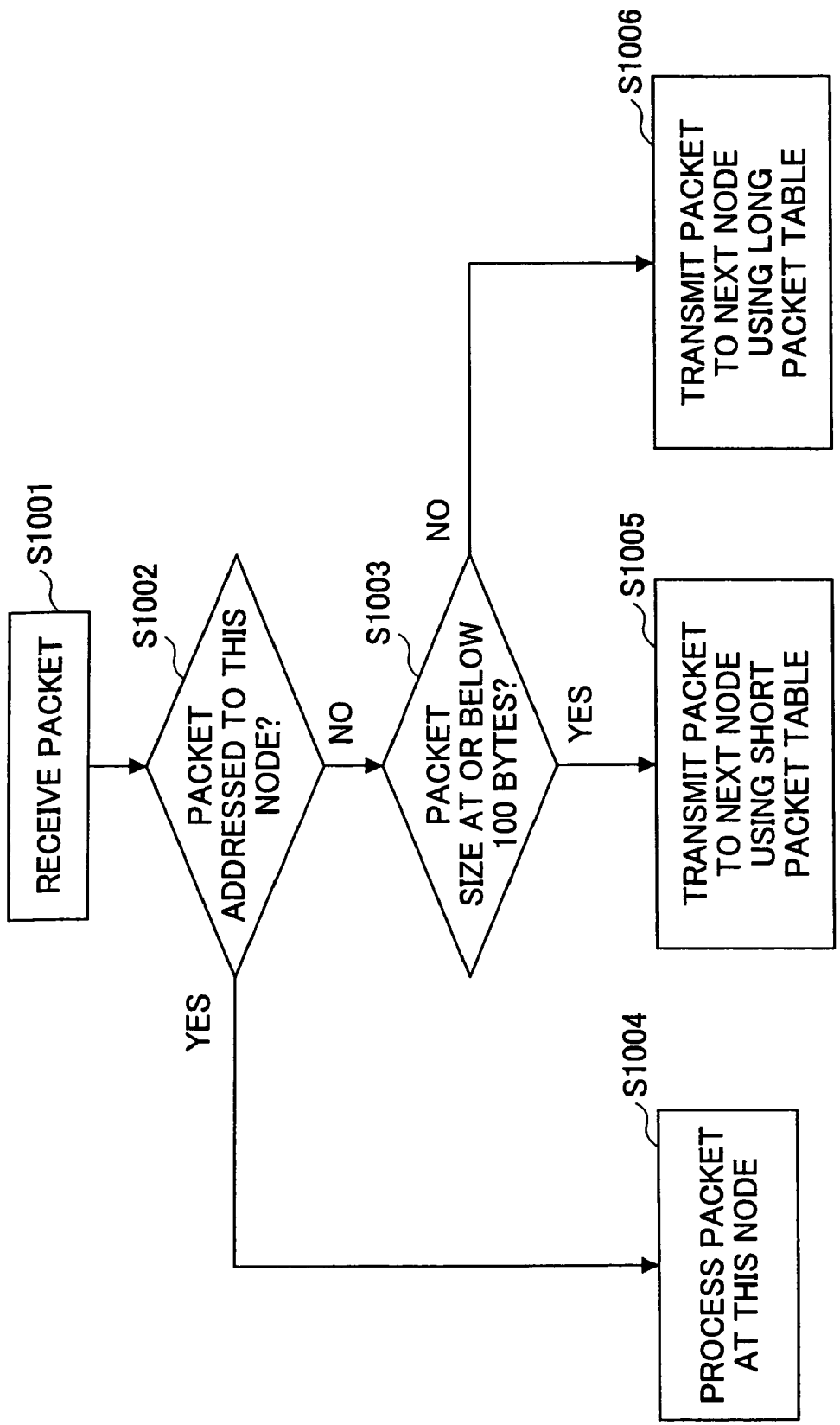
FIG. 16 is a flowchart of the optimum routing method taking the packet size into account according to the second embodiment of the invention.

FIG. 16 is a flowchart showing the operation of the wireless basestation 50 according to the second embodiment of the invention. When receiving a packet (S1001), the wireless basestation 50 determines, at the packet checking unit 55, whether the packet is addressed to the wireless basestaion 50 itself (S1002). If the packet is addressed to the wireless basestation 50 (YES in S1002), the packet is processed at the wireless basestation 50 (S1004) because it is unnecessary to transmit the packet to the next node. If the packet is addressed to another node or terminal device (NO in S1002), then the packet size determination unit 56 determines whether the packet size or the payload size is at or below the prescribed reference value, for example, 100 bytes (S1003). If the payload size is less than or equal to the prescribed value (YES in S1003), the wireless basestation 50 selects a route recorded in the short packet table 57 in association with the destination, and transmits the packet to the next node (S1005). If the packet size or the payload size exceeds the reference value (NO in S1003), the wireless basestation 50 selects a route recorded in the long packet table 58 in association with the destination, and transmits the packet to the next node (S1O06).

Figure 17:
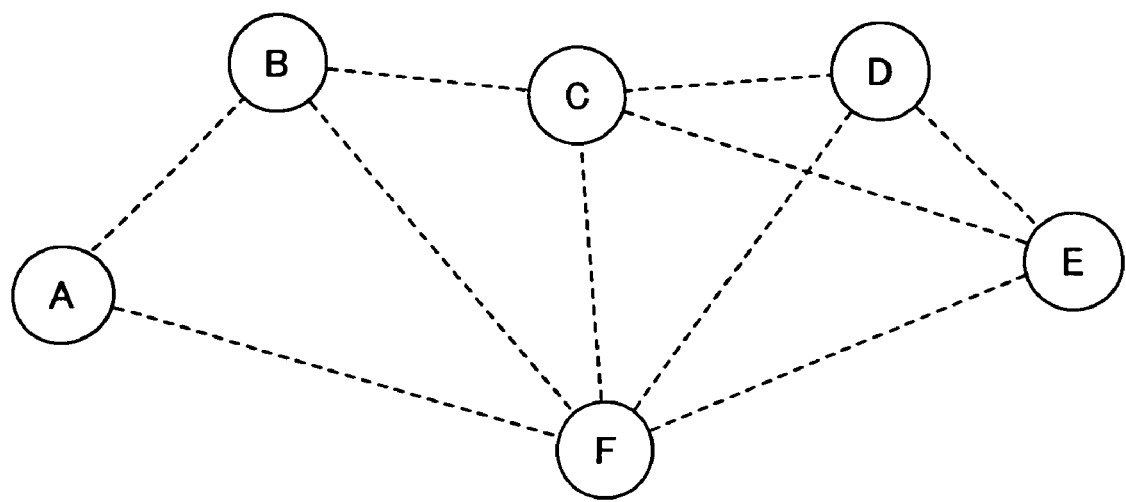
FIG. 17 is a schematic diagram illustrating a network structure to which the optimum routing method of the second embodiment is applied.

FIG. 17 is an example of the network topology to which packet transmission route optimization of the second embodiment is applied. The network includes wireless basestations A-F. The nodes mutually connected by the dashed lines can communicate with each other. The wireless basestations A-F function as wireless bridges to relay packets between nodes or network segments. Although not shown in FIG. 17, one or more terminal devices without bridging functions may be connected to one of the wireless basestations.

Figure 18A:
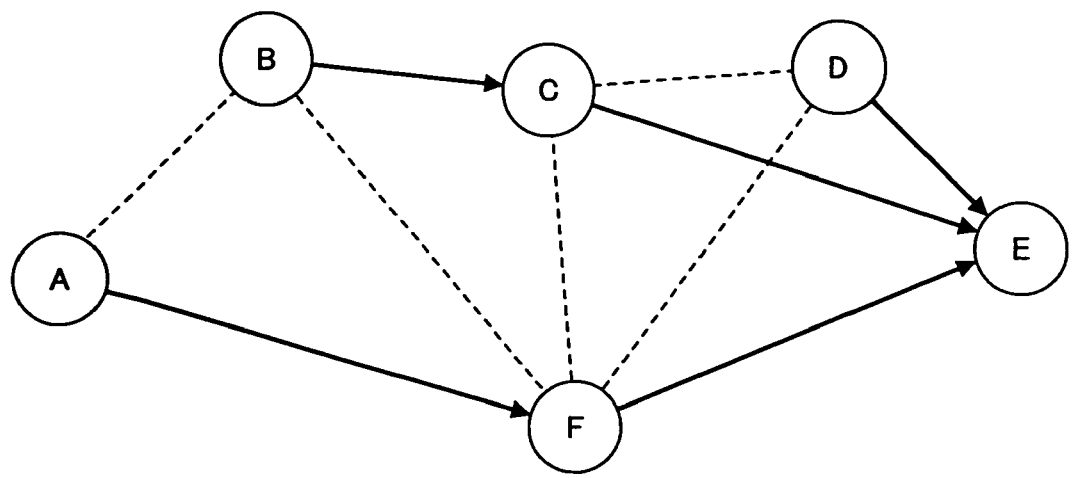
FIG. 18A illustrates an example of the short packet transmission route.

FIG. 18A illustrates an example of short packet transmission route leading to wireless basestation E in the network shown in FIG. 17. Since the overhead rate (due to header transmission or other factors) is high in short packet transmission, a route with fewer hops is advantageous. When transmitting a packet from A to E, a route A→F→E with fewer hops is selected. When transmitting a packet from B to E, a route B→C→E with fewer hops is selected. From wireless basestation D, a packet is transmitted directly to E, which is the adjacent node of D.

Figure 18B:
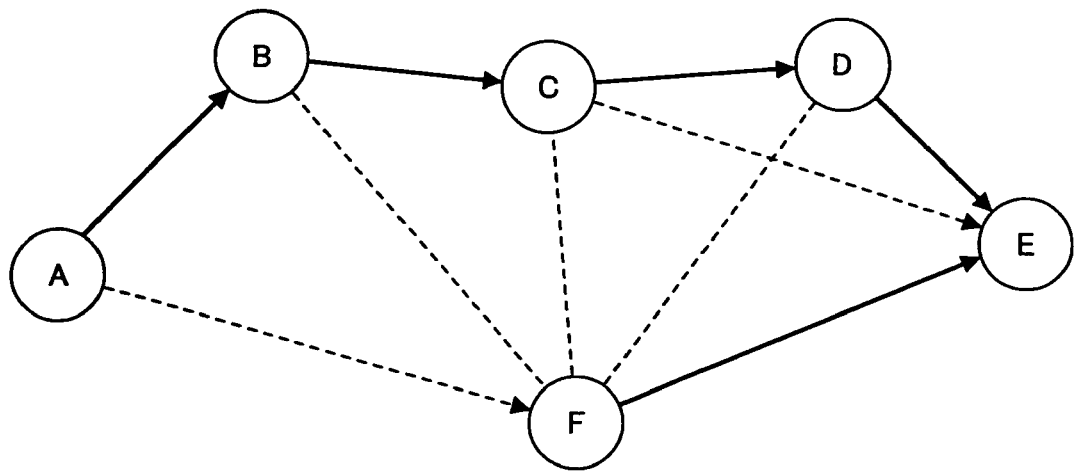
FIG. 18B illustrates an example of the long packet transmission route.

FIG. 18B illustrates an example of long packet transmission route leading to wireless basestation E in the network shown in FIG. 17. Since the overhead with respect to the data transmission time is smaller in transmission of long packets, a route with a higher transmission bit rate is selected even if the number of hops increases. When transmitting a packet from A to E, a section with a higher bit rate is selected, and a route A→B→C→D→E with the shortest total transmission time is selected. When transmitting a packet from F to E, a route F→E is selected in the example shown in FIG. 18B. However, if the total transmission time through the route F→D→E becomes shorter (that is, if the bit rate of this routes become higher) depending on the radio environment, then, the latter route is selected.

FIG. 19 illustrates an example of the routing table held in wireless basestation A. The table shown in FIG. 19A is a short packet table, and the table shown in FIG. 19B is a long packet table. In these tables, a route is recorded in association with a destination node so as to include all the nodes from wireless basestation A to the destination node.

FIG. 20 illustrates another example of the routing table. The table shown in FIG. 20A is a short packet table, and the table shown in FIG. 20B is a long packet table. In these tables, a route is designated by indicating only the next node, which route is recorded in association with a destination node.

Figure 21:
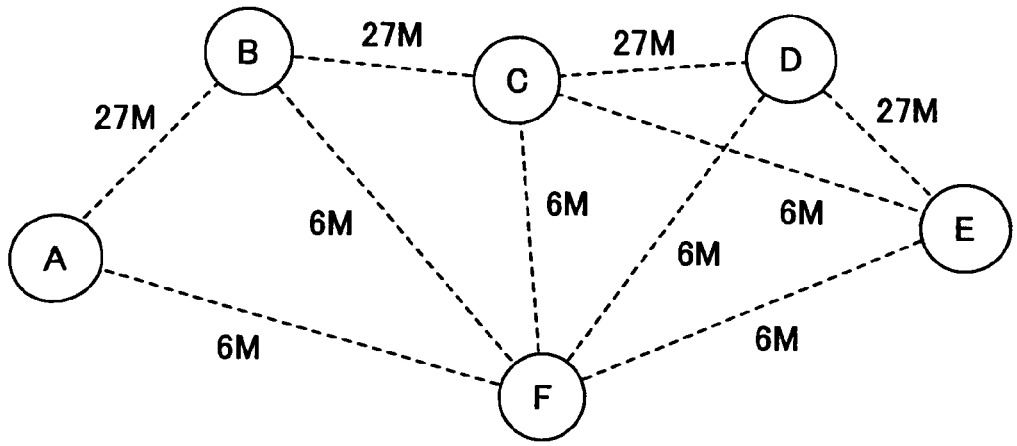
FIG. 21 is a diagram illustrating an example of link cost estimation according to the second embodiment of the invention.

FIG. 21 illustrates an example of link cost estimation for creating or updating the routing tables shown in FIG. 19 and FIG. 20. In this example, a transmission rate of 6 Mbps or 27 Mbps is set to the link between two adjacent nodes, according to the current conditions of the radio channels.

When transmitting a packet from wireless basestation A to wireless basestation E, the wireless basestation A transmits a route search packet to adjacent nodes. Node (wireless basestation) F and node B receive the route search packet, and each of these nodes calculates a link cost from the previous node (node A) to this node for each of the short packet case and the long packet case, and adds the calculation results in the packet. At node F, a short packet link cost of 310 μs and a long packet link cost of 1510 μs are estimated based on the current transmission rate between node A and node F. Similarly, at node B, a short packet link cost of 189 μs and a long packet link cost of 454 μs are estimated based on the transmission rate between node A and node B.

Then, node E receives the packet from node F, and calculates a short packet link cost and a long packet link cost for the channel between node F and node E, and adds the calculation results to the A-F link cost. Similarly, node C, which has received the packet from node B, calculates a short packet link cost and a long packet link cost for the channel between node B and node C, and adds the calculation result to the A-B link cost. By successively repeating this process, several candidate routes from node A to node E can be obtained. In this example, the following candidates of Route 1: A→F→E;
Route 2: A→B→C→E; and
Route 3: A→B→C→D→E are obtained.

When the route search packets reach node E, the total link costs of short packet transmission and long packet transmission are obtained for each of the candidate routes. For short packet transmission, cost 1 of Route 1 is 620 µs and the cheapest. Accordingly, Route 1 with the fewest hop number is selected even if the transmission rate is low. For long packet transmission, cost 3 of Route 3 is 1816 µs and the cheapest. Accordingly, Route 3 with the highest transmission rate is selected even if the number of hops is large.

The routes selected for both short packet transmission and long packet transmission are reported to each of the nodes (wireless basestations) in the network, and the short packet table and the long packet table are updated at each node. When wireless basestation A transmits a data packet of short size next time, it checks the short packet table and transmits the packet to the next node E designated in the table. When wireless basestation A transmits a long data packet, it transmits the packet to the next node B by consulting the long packet table.

Although, in FIG. 21, link cost is estimated using a route search packet in order to determine the optimum route, this technique may be applied to the first embodiment, in which the network uses two or more transmission trees. In this case, both a short packet link cost and a long packet link cost are added to the tree creation packet transmitted from the root bridge, at each of the bridges. Then, a non-loop transmission tree selected from the final link cost is reported to each of the wireless basestations (bridges). To this end, each of the wireless basestations has a short packet transmission tree table and a long packet transmission tree table.

Although the second embodiment has been described using the example based on the IEEE 802.11a standard, the invention is not limited to this example. The link cost can be estimated according to the above-described techniques in an arbitrary transmission system to determine the optimum route taking the transmission rate and the packet size into account. Link cost estimation may be performed using three or more reference values about the packet size or the payload size.

With the arrangement of the second embodiment, the optimum packet transmission route can be appropriately selected taking the packet size into account in an ad hoc wireless network under frequently changing network topology and radio environment over time and locations.

This patent application is based on and claims the benefit of the earlier filing dates of Japanese Patent Application Nos. 2004-041604 and 2004-277495 filed Feb. 18, 2004 and Sep. 24, 2004, respectively, the entire contents of which are hereby incorporated by reference.

What is claimed is:

1. A packet transmission system, comprising:
a plurality of wireless basestations; and
one or more wireless terminal devices belonging to one of the wireless basestations, wherein,
the system employs a plurality of transmission trees created between the plurality of wireless basestations and based on a link cost between a target wireless basestation and at least one adjacent wireless basestation, the link cost based on a signal power level received from the at least one adjacent wireless basestation and an error rate of the at least one adjacent wireless basestation,
each of the wireless basestations having a tree table for recording a root basestation in association with ID information about the transmission trees,
each of the wireless basestations determines the transmission tree to be used for packet transmission when receiving a packet, and transmits the packet to another wireless basestation designated as a next node along the determined transmission tree, and
each of the wireless basestations has a location table that records the one or more wireless terminal devices in association with a corresponding one of the wireless basestations, the location table being created by exchanging information, among the wireless basestations, about the one or more wireless terminal devices currently located under a corresponding basestation.

2. The system of claim 1, wherein each of the wireless basestations identifies the wireless basestation corresponding to a source terminal device or a destination terminal device when receiving the packet, based on a source address or a destination address contained in the received packet, determines the transmission tree extending from the identified wireless basestation as the root basestation, and transmits the packet to the next node along the determined transmission tree.

3. The system of claim 2, wherein when a new wireless terminal device is connected to one of the wireless basestations, said one of the wireless basestations broadcasts a message packet for reporting the connection of the new wireless terminal device to the other wireless basestations along the transmission tree, and each of the other wireless basestations updates the location table when receiving the message packet.

4. The system of claim 1, wherein the packet contains the ID information of the transmission tree currently being used for the packet transmission or address information of the root basestation, and each of the wireless basestations determines the currently used transmission tree based on the ID information or the address information contained in the packet when receiving the packet.

5. A wireless basestation used in a wireless packet transmission network, comprising:
a tree table configured to record information about a plurality of transmission trees used in the wireless packet transmission network, in association with corresponding root information, the transmission trees being created based on a link cost between the wireless basestation and at least one adjacent wireless basestation, the link cost based on a signal power level received from the at least one adjacent wireless basestation and an error rate of the at least one adjacent wireless basestation;
a packet receiving unit configured to receive a packet;
a tree determination unit configured to select one of the transmission trees to be used for packet transmission, based on the information contained in the received packet;
a packet transmitting unit configured to transmit the packet to a next node along the selected transmission tree, referring to the tree table; and
a location table configured to record one or more wireless terminal devices in association with a corresponding one of a plurality of wireless basestations, the location table being created by exchanging information, among the plurality of wireless basestations, about the one or more wireless terminal devices currently located under a corresponding basestation.

6. The wireless basestation of claim 5, wherein the tree determination unit determines the wireless terminal device indicated by a source address or a destination address contained in the received packet, determines the corresponding wireless basestation to which the wireless terminal device currently belongs from the location table, and determines the transmission tree extending from the determined wireless basestation as the root information.

7. The wireless basestation of claim 6, wherein a new wireless terminal device is connected to this wireless basestation, and the packet transmitting unit broadcasts a message packet reporting the connection of the new wireless terminal device along the transmission tree.

8. The wireless basestation of claim 5, further comprising:
a packet checking unit configured to extract transmission tree ID information or the root information from the received packet, wherein the tree determination unit determines the transmission tree to be used for the packet transmission based on the extracted information.

9. The wireless basestation of claim 8, wherein when the wireless basestation receives a packet from a wireless terminal device currently located under this wireless basestation, the packet transmitting unit adds ID information about the transmission tree extending from the wireless basestation itself as the root information into the packet, and transmits the packet along the transmission tree.

10. The wireless basestation of claim 5, further comprising:
a cost table configured to list the link cost, wherein the packet transmitting unit transmits a first tree creation packet when creating the transmission tree extending from this wireless basestation as the root information, and when the packet receiving unit receives a second tree creation packet from another wireless basestation in the wireless packet transmission network, the transmitting unit adds the link cost estimated at the wireless basestation to the second tree creation packet, based on the cost table, and transmits the second tree creation packet.

11. A packet transmission method used in a wireless packet transmission network including a plurality of wireless basestations and one or more wireless terminal devices located under one of the wireless basestations, comprising:
creating two or more transmission trees between the plurality of wireless basestations and based on a link cost between a target wireless basestation and at least one adjacent wireless basestation, the link cost based on a signal power level received from the at least one adjacent wireless basestation and an error rate of the at least one adjacent wireless basestation, each transmission tree extending from one of the wireless basestations as a root basestation;
providing an information pair of each of the transmission trees and the corresponding root basestation to each of the wireless basestations;
determining the transmission tree to be used for transmission of the received packet when receiving a packet at any of the wireless basestations;
transmitting the packet to a next node along the determined transmission tree; and
creating a location table that records the one or more wireless terminal devices in association with a corresponding one of the wireless basestations, the location table being created by exchanging information, among the wireless basestations, about the one or more wireless terminal devices currently located under a corresponding basestation.

12. A wireless basestation used in a wireless communications network, comprising:
a transmitting and receiving unit configured to transmit and receive a packet;
a packet size determination unit configured to determine a size of the received packet;
a cost estimation unit configured to calculate a link cost between the wireless basestation and at least one adjacent wireless basestation, for each of a packet size criteria, based on a transmission rate of the channel, the transmission rate of a channel based on a signal power level received from the at least one adjacent wireless basestation and an error rate of the at least one adjacent wireless basestation; and
a plurality of transmission trees created based on the link cost and employed based on the packet size criteria, each transmission tree describing destination information in association with a packet transmission route; and
a location table configured to record one or more wireless terminal devices in association with a corresponding one of a plurality of wireless basestations, the location table being created by exchanging information, among the plurality of wireless basestations, about the one or more wireless terminal devices currently located under a corresponding basestation, wherein the transmitting and receiving unit transmits the received packet to a next node, referring to one of the transmission trees based on the packet size.

13. The wireless basestation of claim 12, wherein the transmission trees include
short packet routing means for describing the destination information in association with the packet transmission route for a short packet with the packet size at or below a prescribed reference value, and
long packet routing means for describing the destination information in association with the packet transmission route for a long packet with the packet size exceeding the prescribed reference value,
wherein the transmitting and receiving unit transmits the received packet to the next node, referring to either the short packet routing means or the long packet routing means.

14. The wireless basestation of claim 12, wherein when a cost estimation request packet is received, the cost estimation unit calculates the link cost for the channel between a previous node and the wireless basestation for each of the packet size criteria, and adds the calculation results in the cost estimation request packet, and the transmitting and receiving unit transmits the cost estimation request packet with the added calculation results to adjacent nodes.

15. A packet transmission route optimizing method in a wireless network including a plurality of wireless basestations, comprising:
calculating a link cost between the wireless basestation and at least one adjacent wireless basestation, for each of packet size criteria, based on a transmission rate of a channel, the transmission rate of the channel based on a signal power level received from the at least one adjacent wireless basestation and an error rate of the at least one adjacent wireless basestation;
setting a plurality of transmission trees based on the link cost for the respective packet size criteria, each transmission tree recording destination information in association with a transmission route;
determining the packet size when receiving a packet at one of the wireless basestations;

transmitting the packet to a next node according to one of the transmission trees selected based on the determined packet size; and creating a location table that records one or more wireless terminal devices in association with a corresponding one of the plurality of wireless basestations, the location table being created by exchanging information, among the wireless basestations, about the one or more wireless terminal devices currently located under a corresponding basestation.

16. The packet transmission route optimizing method of claim 15, further comprising:

when receiving a cost estimation request packet at one of the wireless basestations, calculating the link cost between a previous node and said one of the wireless basestations, for each of the packet size criteria;

adding the calculation results to the cost estimation request packet and transmitting the cost estimation request packet to adjacent wireless basestations;

selecting a route to a destination with the lowest link cost for each of the packet size criteria; and updating each of the transmission trees based on the selected routes at each of the wireless basestations.

17. The system of claim 1, wherein the link cost is further based on a transmit queue size added to the transmitted packet when creating a transmission tree, and the link cost between the target wireless basestation and the at least one adjacent wireless basestation is calculated by the following equation, using normalization factors $\alpha$, $\beta$, and $\gamma$:

$$\text{link cost} = \alpha*(\text{signal power level}) + \beta*(\text{transmit queue size}) + \gamma*(\text{error rate}).$$

* * * * *